United States Patent
Van De Ven et al.

(10) Patent No.: US 9,921,428 B2
(45) Date of Patent: Mar. 20, 2018

(54) LIGHT DEVICES, DISPLAY DEVICES, BACKLIGHTING DEVICES, EDGE-LIGHTING DEVICES, COMBINATION BACKLIGHTING AND EDGE-LIGHTING DEVICES

(75) Inventors: Antony Paul Van De Ven, Hong Kong (CN); Gerald H. Negley, Durham, NC (US); Shawn Pyles, Holly Springs, NC (US)

(73) Assignee: Cree, Inc., Durham, NC (US)

( * ) Notice: Subject to any disclaimer, the term of this patent is extended or adjusted under 35 U.S.C. 154(b) by 1457 days.

(21) Appl. No.: 13/042,663

(22) Filed: Mar. 8, 2011

(65) Prior Publication Data

US 2011/0242453 A1    Oct. 6, 2011

Related U.S. Application Data

(63) Continuation-in-part of application No. 11/736,761, filed on Apr. 18, 2007, now Pat. No. 8,513,875, and
(Continued)

(51) Int. Cl.
*G02F 1/1335* (2006.01)
*F21V 8/00* (2006.01)

(52) U.S. Cl.
CPC ..... *G02F 1/133603* (2013.01); *G02B 6/0068* (2013.01); *G02B 6/0078* (2013.01);
(Continued)

(58) Field of Classification Search
CPC ......... G02F 1/133603; G02F 1/133609; G02B 6/0068; G02B 6/0078
(Continued)

(56) References Cited

U.S. PATENT DOCUMENTS 5,384,519 A   1/1995 Gotoh
5,803,579 A   9/1998 Turnbull et al.
(Continued)

FOREIGN PATENT DOCUMENTS

CN   101438630   3/2013
EP   1 160 883   12/2001
(Continued)

OTHER PUBLICATIONS

Ashdown, Ian, *Accurate Modeling of LED colors: a scientific approach*, LEDs Magazine, ledsmagazine.com, Oct. 2005, pp. 1-3.
(Continued)

*Primary Examiner* — Anne Hines
(74) *Attorney, Agent, or Firm* — Burr & Brown, PLLC

(57) ABSTRACT

In some embodiments, an LCD device comprising (1) liquid crystals, (2) at least one lighting device that emits BSY-1, BSY-2, BSR, BSG-1, BSG-2 and/or BSG-3 light, (3) solid state light emitters (430-480 nm) and luminescent material (555-585 nm, 595-625 nm, or 510-560 nm), and/or (4) a light guide, a reflector and/or a light polarizer. In some embodiments, a light device comprising (1) at least one lighting device that emits BSY-1, BSY-2, BSR, BSG-1, BSG-2 and/or BSG-3 light, (2) a light guide, a reflector and/or a light polarizer, and/or (3) solid state light emitters (430-480 nm) and luminescent material (555-585 nm, 595-625 nm, or 510-560 nm).

63 Claims, 6 Drawing Sheets

Figure 1:
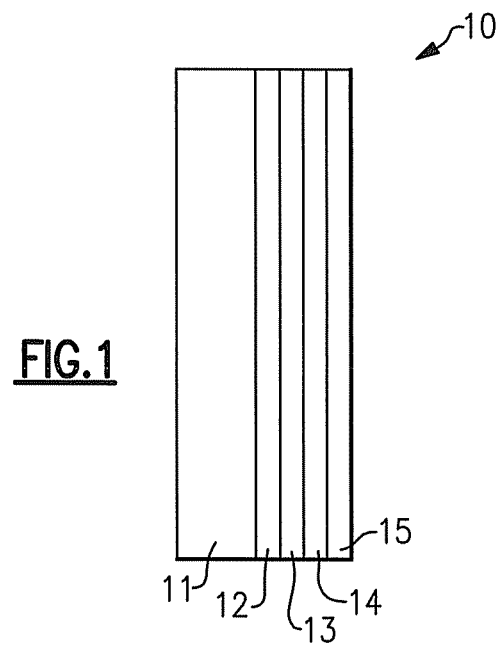

Related U.S. Application Data a continuation-in-part of application No. 11/948,021, filed on Nov. 30, 2007, now Pat. No. 9,084,328.

(60) Provisional application No. 61/447,373, filed on Feb. 28, 2011, provisional application No. 60/792,859, filed on Apr. 18, 2006, provisional application No. 60/793,524, filed on Apr. 20, 2006, provisional application No. 60/868,134, filed on Dec. 1, 2006.

(52) U.S. Cl.
CPC ............. *G02F 1/133609* (2013.01); *G02F 2001/133613* (2013.01); *G02F 2201/52* (2013.01)

(58) Field of Classification Search
USPC .................................. 313/502–509
See application file for complete search history.

(56) References Cited

U.S. PATENT DOCUMENTS

| | | | |
|---|---|---|---|
| 6,132,072 | A | 10/2000 | Turnbull et al. |
| 6,153,971 | A | 11/2000 | Shimizu et al. |
| 6,212,213 | B1 | 4/2001 | Weber et al. |
| 6,234,648 | B1 | 5/2001 | Borner et al. |
| 6,513,949 | B1 | 2/2003 | Marshall et al. |
| 6,538,371 | B1 | 3/2003 | Duggal et al. |
| 6,550,949 | B1 | 4/2003 | Bauer et al. |
| 6,552,495 | B1 | 4/2003 | Chang |
| 6,577,073 | B2 | 6/2003 | Shimizu et al. |
| 6,692,136 | B2 | 2/2004 | Marshall et al. |
| 6,784,463 | B2 | 8/2004 | Camras et al. |
| 6,817,735 | B2 | 11/2004 | Shimizu et al. |
| 6,841,804 | B1 | 1/2005 | Lung-Chien et al. |
| 6,914,267 | B2 | 7/2005 | Fukasawa et al. |
| 6,936,857 | B2 | 8/2005 | Doxsee et al. |
| 7,005,679 | B2 | 2/2006 | Tarsa et al. |
| 7,008,078 | B2 | 3/2006 | Shimizu et al. |
| 7,014,336 | B1 | 3/2006 | Ducharme et al. |
| 7,061,454 | B2 | 6/2006 | Sasuga et al. |
| 7,066,623 | B2 | 6/2006 | Lee et al. |
| 7,095,056 | B2 | 8/2006 | Vitta |
| 7,144,121 | B2 | 12/2006 | Minano et al. |
| 7,213,940 | B1 | 5/2007 | Van De Ven et al. |
| 7,358,954 | B2 | 4/2008 | Negley |
| 7,365,485 | B2 | 4/2008 | Fukasawa et al. |
| 7,476,016 | B2 | 1/2009 | Kurihara |
| 7,582,906 | B2 | 9/2009 | Kurihara |
| 7,695,150 | B2 | 4/2010 | Dejima et al. |
| 7,821,188 | B2 | 10/2010 | Kurihara et al. |
| 7,859,175 | B2 | 12/2010 | Kurihara et al. |
| 2002/0070681 | A1* | 6/2002 | Shimizu et al. ............... 315/246 |
| 2003/0030063 | A1 | 2/2003 | Sosniak et al. |
| 2003/0067773 | A1 | 4/2003 | Marshall et al. |
| 2003/0146411 | A1 | 8/2003 | Srivastava et al. |
| 2004/0105261 | A1 | 6/2004 | Ducharme et al. |
| 2004/0179366 | A1 | 9/2004 | Takeda et al. |
| 2004/0217364 | A1 | 11/2004 | Tarsa et al. |
| 2005/0082974 | A1 | 4/2005 | Fukasawa et al. |
| 2006/0012989 | A1 | 1/2006 | Lee et al. |
| 2006/0105482 | A1 | 5/2006 | Alferink et al. |
| 2006/0180818 | A1 | 8/2006 | Nagai et al. |
| 2007/0001188 | A1 | 1/2007 | Lee |
| 2007/0053178 | A1* | 3/2007 | Li et al. .................. 362/97 |
| 2007/0159091 | A1 | 7/2007 | Hirosaki et al. |
| 2010/0025700 | A1* | 2/2010 | Jung ...................... F21K 9/00 257/89 |
| 2010/0079059 | A1 | 4/2010 | Roberts et al. |
| 2010/0238648 | A1 | 9/2010 | Tsukahara |
| 2010/0271568 | A1* | 10/2010 | Jung et al. ................. 349/65 |
| 2011/0019399 | A1 | 1/2011 | Van De Ven et al. |
| 2011/0037413 | A1* | 2/2011 | Negley et al. ............ 315/294 |
| 2011/0241044 | A1* | 10/2011 | Jang ................. G02F 1/133603 257/98 |
| 2011/0273107 | A1* | 11/2011 | Hsia ...................... F21K 9/56 315/250 |
| 2012/0176788 | A1 | 7/2012 | Van De Ven et al. |
| 2014/0226326 | A1 | 8/2014 | Van De Ven et al. |

FOREIGN PATENT DOCUMENTS

| | | |
|---|---|---|
| JP | 10-163535 | 6/1998 |
| JP | 2003-515956 | 5/2003 |
| JP | 2003-529889 | 10/2003 |
| JP | 2004-080046 | 3/2004 |
| JP | 2004-103443 | 4/2004 |
| JP | 2004-356116 | 12/2004 |
| JP | 2005-142311 | 6/2005 |
| WO | 2005/013365 | 2/2005 |
| WO | 2005/124877 | 12/2005 |
| WO | 2006/028312 | 3/2006 |

OTHER PUBLICATIONS

2007/0278934, Dec. 6, 1007, U.S. Appl. No. 11/736,761, filed Apr. 18, 2007, Vande Ven.
2008-0130285, Jun. 5, 2008, U.S. Appl. No. 11/948,021, filed Nov. 30, 2007, Negley.
2007-0139920, Jun. 21, 2007, U.S. Appl. No. 11/613,714, filed Dec. 20, 2006, Van de Ven.
2007-0137074, Jun. 21, 2007, U.S. Appl. No. 11/613,733, filed Dec. 20, 2006, Van de Ven.
2007-0267983, Nov. 22, 2007, U.S. Appl. No. 11/736,799, filed Apr. 18, 2007, Van de Ven.
2007-0278503, Dec. 6, 2007, U.S. Appl. No. 11/737,321, filed Apr. 19, 2007, Van de Ven.
2008-0106895, May 8, 2008, U.S. Appl. No. 11/936,163, filed Nov. 7, 2007, Van de Ven.
2008-0304260m, Dec. 11, 2008, U.S. Appl. No. 12/117,122, filed May 8, 2008, Van de Ven.
2008-0278940, Nov. 13, 2008, U.S. Appl. No. 12/117,131, filed May 8, 2008, Van de Ven.
2008-0278928, Nov. 13, 2008, U.S. Appl. No. 12/117,136, filed May 8, 2008, Van de Ven.
7,213,940, May 8, 0007, U.S. Appl. No. 11/566,440, filed Dec. 4, 2006, Van de Ven.
2009-0296384, Dec. 3, 2009, U.S. Appl. No. 12/475,850, filed Jun. 1, 2009, Van de Ven.
2009-0184616, Jul. 23, 2009, U.S. Appl. No. 12/248,220, filed Oct. 9, 2008, Van de Ven.
2008-0136313, Jun. 12, 2008, U.S. Appl. No. 11/951,626, filed Dec. 6, 2007, Van de Ven.
2008-0259589, Oct. 23, 2008, U.S. Appl. No. 12/035,604, filed Feb. 22, 2008, Van de Ven.
2008-0304261, Dec. 11, 2008, U.S. Appl. No. 12/117,148, filed May 8, 2008, Van de Ven.
2011-0031894, Feb. 10, 2011, U.S. Appl. No. 12/535,319, filed Aug. 4, 2009, Van de Ven.
2011/0037409, Feb. 17, 2011, U.S. Appl. No. 12/541,215, filed Aug. 14, 2009, Van de Ven.
Van de Ven et al., "Warm White Illumination with High CRI and High Efficacy by Combining 455 nm Excited Yellowish Phosphor LEDs and Red AlInGaP LEDs", First International Conference on White LEDs and Solid State Lighting.
Cree® XLamp® 7090 XR-E Series LED Binning and Labeling.
Katzmaier "The price of thin: Samsung reveals its edge-lit LED-based LCDs", Mar. 31, 2009, http://news.cnet.com/8301-17938_105-10208593-1.html, 14 pages.
Tyson, "How LCDs Work", http://electronics.howstuffworks.com/lcd.htm, printed on May 27, 2010, 16 pages.
From Wikipedia, "Backlight", http//en.wikipedia.org/wiki/Backlight, printed on May 27, 2010, pp. 1-4.
From Wikipedia, "Liquid Crystal Display", http//en.wikipedia.org/wiki/Liquid_crystal_display, printed on Jul. 22, 2010, pp. 1-13.

(56) References Cited

OTHER PUBLICATIONS

Chinese Office Action (and translation provided by foreign counsel) from a corresponding Chinese patent application dated Jul. 2, 2015, 25 pages.

* cited by examiner

LIGHT DEVICES, DISPLAY DEVICES, BACKLIGHTING DEVICES, EDGE-LIGHTING DEVICES, COMBINATION BACKLIGHTING AND EDGE-LIGHTING DEVICES

CROSS-REFERENCE TO RELATED APPLICATIONS

This application is a continuation-in-part of U.S. patent application Ser. No. 11/736,761, filed Apr. 18, 2007 (now U.S. Patent Publication No. 2007/0278934), the entirety of which is hereby incorporated by reference as if set forth in its entirety.

This application is a continuation-in-part of U.S. patent application Ser. No. 11/948,021, filed on Nov. 30, 2007 (now U.S. Patent Publication No. 2008/0130285), the entirety of which is hereby incorporated by reference as if set forth in its entirety.

This application claims the benefit of U.S. Provisional Patent Application No. 61/447,373, filed on Feb. 28, 2011, the entirety of which is hereby incorporated by reference.

This application claims the benefit of U.S. Provisional Patent Application No. 60/792,859, filed on Apr. 18, 2006, entitled "LIGHTING DEVICE AND LIGHTING METHOD" (inventors: Gerald H. Negley and Antony Paul van de Ven), the entirety of which is hereby incorporated by reference.

This application claims the benefit of U.S. Provisional Patent Application No. 60/793,524, filed on Apr. 20, 2006, the entirety of which is hereby incorporated by reference.

This application claims the benefit of U.S. Provisional Patent Application No. 60/868,134, filed on Dec. 1, 2006, entitled "LIGHTING DEVICE AND LIGHTING METHOD" (inventors: Gerald H. Negley and Antony Paul van de Ven), the entirety of which is hereby incorporated by reference.

The entirety of U.S. Pat. No. 7,213,940 (granted on U.S. patent application Ser. No. 11/566,440, filed on Dec. 4, 2006, entitled "LIGHTING DEVICE AND LIGHTING METHOD", inventors: Antony Paul van de Ven and Gerald H. Negley) is hereby incorporated by reference.

FIELD OF THE INVENTIVE SUBJECT MATTER

The present inventive subject matter relates to backlighting devices, edge-lighting devices, combination backlighting and edge-lighting devices, and display devices that incorporate one or more of the same. In some aspects, the present inventive subject matter relates to backlighting and/or edge-lighting devices for liquid crystal display (LCD) devices, and to LCD devices that incorporate such backlighting and/or edge-lighting devices. In some aspects, the present inventive subject matter relates to backlighting and/or edge-lighting devices that comprise one or more solid state light emitters, and to display devices that incorporate such backlighting and/or edge-lighting devices.

BACKGROUND

There are many backlit display devices and many edge-lit display devices currently in use, and it is expected that the number will continue to increase. A wide variety of such displays are currently available. Liquid crystal backlit displays and liquid crystal edge-lit displays are used in a wide variety of products, such as laptop computers, cellular telephones and flat screen televisions.

There is an ongoing effort to provide backlit displays and edge-lit displays that are more energy-efficient, that provide better color reproduction and/or that are more durable.

Solid state light emitters (e.g., light emitting diodes) are receiving much attention in all fields of light emission for several reasons. It is well known that solid state light emitters are more energy efficient than incandescent light bulbs and fluorescent light bulbs (fluorescent light bulbs are more efficient than incandescent light bulbs, but are less efficient than light emitting diodes).

In addition, the normal lifetimes of solid state light emitters (typically between 50,000 and 70,000 hours) are typically higher than those of incandescent light bulbs (typically about 750-1000 hours) and fluorescent bulbs (e.g., some fluorescent bulbs have reported lifetimes of 10,000-20,000 hours).

Furthermore, solid state light emitters are typically more durable than other types of light emitters.

The color of visible light output by a light emitter, and/or the color of blended visible light output by a plurality of light emitters can be represented on a 1931 CIE (Commission International de l'Eclairage) Chromaticity Diagram or on a 1976 CIE Chromaticity Diagram. Persons of skill in the art are familiar with these diagrams, and these diagrams are readily available (e.g., by searching "CIE Chromaticity Diagram" on the internet).

The CIE Chromaticity Diagrams map out the human color perception in terms of two CIE parameters x and y (in the case of the 1931 diagram) or u' and v' (in the case of the 1976 diagram). Each point (i.e., each "color point") on the respective Diagrams corresponds to a particular color. For a technical description of CIE chromaticity diagrams, see, for example, "Encyclopedia of Physical Science and Technology", vol. 7, 230-231 (Robert A Meyers ed., 1987). The spectral colors are distributed around the boundary of the outlined space, which includes all of the hues perceived by the human eye. The boundary represents maximum saturation for the spectral colors.

The 1931 CIE Chromaticity Diagram can be used to define colors as weighted sums of different hues. The 1976 CIE Chromaticity Diagram is similar to the 1931 Diagram, except that similar distances on the 1976 Diagram represent similar perceived differences in color.

The expression "hue", as used herein, means light that has a color shade and saturation that correspond to a specific point on a CIE Chromaticity Diagram, i.e., a point that can be characterized with x,y coordinates on the 1931 CIE Chromaticity Diagram or with u', v' coordinates on the 1976 CIE Chromaticity Diagram.

In the 1931 Diagram, deviation from a point on the Diagram (i.e., "color point") can be expressed either in terms of the x, y coordinates or, alternatively, in order to give an indication as to the extent of the perceived difference in color, in terms of MacAdam ellipses. For example, a locus of points defined as being ten MacAdam ellipses from a specified hue defined by a particular set of coordinates on the 1931 Diagram consists of hues that would each be perceived as differing from the specified hue to a common extent (and likewise for loci of points defined as being spaced from a particular hue by other quantities of MacAdam ellipses).

A typical human eye is able to differentiate between hues that are spaced from each other by more than seven MacAdam ellipses (but is not able to differentiate between hues that are spaced from each other by seven or fewer MacAdam ellipses).

Since similar distances on the 1976 Diagram represent similar perceived differences in color, deviation from a point on the 1976 Diagram can be expressed in terms of the coordinates, u' and v', e.g., distance from the point=$(\Delta u'^2 + \Delta v'^2)^{1/2}$. This formula gives a value, in the scale of the u' v' coordinates, corresponding to the distance between points. The hues defined by a locus of points that are each a common distance from a specified color point consist of hues that would each be perceived as differing from the specified hue to a common extent.

A series of points that is commonly represented on the CIE Diagrams is referred to as the blackbody locus. The chromaticity coordinates (i.e., color points) that lie along the blackbody locus obey Planck's equation: $E(\lambda) = A \lambda^{-5}/(e^{(B/T)}-1)$, where E is the emission intensity, $\lambda$ is the emission wavelength, T is the color temperature of the blackbody and A and B are constants. The 1976 CIE Diagram includes temperature listings along the blackbody locus. These temperature listings show the color path of a blackbody radiator that is caused to increase to such temperatures. As a heated object becomes incandescent, it first glows reddish, then yellowish, then white, and finally blueish. This occurs because the wavelength associated with the peak radiation of the blackbody radiator becomes progressively shorter with increased temperature, consistent with the Wien Displacement Law. Illuminants that produce light that is on or near the blackbody locus can thus be described in terms of their color temperature.

BRIEF SUMMARY

In accordance with a first aspect of the present inventive subject matter, it has unexpectedly been found that a display can be lit (i.e., backlit and/or edge-lit) with surprisingly high energy efficiency by providing light that has x, y color coordinates (on a 1931 CIE Chromaticity Diagram) which define a point that is:

(1) light that has x, y color coordinates (on a 1931 CIE Chromaticity Diagram) which define a point that is within a first area on the 1931 CIE Chromaticity Diagram enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, (2) light that has x, y color coordinates (on a 1931 CIE Chromaticity Diagram) which define a point that is within a second area on the 1931 CIE Chromaticity Diagram enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53 (in the 1976 CIE Chromaticity Diagram, the sixth point has u', v' coordinates of 0.17, 0.48, the seventh point has u', v' coordinates of 0.20, 0.48, the eighth point has u', v' coordinates of 0.22, 0.53, the ninth point has u', v' coordinates of 0.22, 0.55, and the tenth point has u', v' coordinates of 0.18, 0.55), (3) light that has x, y color coordinates (on a 1931 CIE Chromaticity Diagram) which define a point that is within a third area on the 1931 CIE Chromaticity Diagram enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23, (4) light that has x, y color coordinates (on a 1931 CIE Chromaticity Diagram) which define a point that is within a fourth area on the 1931 CIE Chromaticity Diagram enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28, (5) light that has x, y color coordinates (on a 1931 CIE Chromaticity Diagram) which define a point that is within a fifth area on the 1931 CIE Chromaticity Diagram enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44, and/or (6) light that has x, y color coordinates (on a 1931 CIE Chromaticity Diagram) which define a point that is within a sixth area on the 1931 CIE Chromaticity Diagram enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44.

Light that is within the first area (defined above) is referred to herein as "BSY-1" light.

Light that is within the second area (defined above) is referred to herein as "BSY-2" light.

Light that is within the third area (defined above) is referred to herein as "BSR" light.

Light that is within the fourth area (defined above) is referred to herein as "BSG-1" light.

Light that is within the fifth area (defined above) is referred to herein as "BSG-2" light.

Light that is within the sixth area (defined above) is referred to herein as "BSG-3" light.

In accordance with the first aspect of the present inventive subject matter, there is provided a backlighting and/or edge-lighting device that comprises at least one lighting device that emits light selected from among at least one of BSY-1 light, BSY-2 light, BSR light, BSG-1 light, BSG-2 light and BSG-3 light.

In accordance with a second aspect of the present inventive subject matter, there is provided an LCD device that comprises a plurality of liquid crystals and at least one lighting device that emits light selected from among at least one of BSY-1 light, BSY-2 light, BSR light, BSG-1 light, BSG-2 light and BSG-3 light.

In accordance with a third aspect of the present inventive subject matter, there is provided a backlighting and/or edge-lighting device that comprises (1) at least one lighting device that emits light selected from among at least one of BSY-1 light, BSY-2 light, BSR light, BSG-1 light, BSG-2 light and BSG-3 light, and (2) at least one of: (a) at least one light guide (e.g., a light guide that has first and second orthogonal dimensions that are at least twenty times its third orthogonal dimension), (b) at least one reflector (e.g., a reflector that has first and second orthogonal dimensions that are at least ten times its third orthogonal dimension), and (c) at least one light polarizer.

In embodiments according to the first, second and third aspects of the present inventive subject matter that include at least one lighting device that emits light selected from among at least one of BSY-1 light and BSY-2 light, the lighting device can further comprise solid state light emitters which, if illuminated, would emit light having a dominant wavelength in the range of from about −495 nm to about −580 nm (e.g., about −495 nm to about −500 nm, about −500 nm to about −505 nm, about −505 nm to about −510 nm, about −510 nm to about −520 nm, about −520 nm to about −530 nm, about −530 nm to about −540 nm, about −540 nm to about −550 nm, about −550 nm to about −560 nm, about −560 nm to about −570 nm, about −570 nm to about −580 nm, about −495 nm to about −570 nm, about −505 nm to about −580 nm, about −505 nm to about −570 nm, about −505 nm to about −560 nm, about −515 nm to about −570 nm, about −515 nm to about −560 nm, about −515 nm to about −550 nm, about −525 nm to about −560 nm, about −525 nm to about −550 nm, about −525 nm to about −540 nm, about −535 nm to about −550 nm, and/or about −535 nm to about −540 nm).

The wavelength values in the preceding paragraph are negative quantities. Negative wavelength values mean that the wavelength value is a complementary color dominant, i.e., the wavelength cannot be specified with a standard dominant because the color point is on the red-purple boundary—in such situations, by convention, the color point is reflected through the point E, i.e., 0.333, 0.333 (on the 1931 Chromaticity Diagram) onto the border of the 1931 Chromaticity Diagram; that is, the color point that has a wavelength of −568 nm is identified as such because by drawing a ray that starts at the color point (along the red-purple boundary on the border of the 1931 Chromaticity Diagram) and passes through E, the ray will again intersect the border of the color diagram at 568 nm.

In embodiments according to the first, second and third aspects of the present inventive subject matter that include at least one lighting device that emits BSR light, the lighting device can further comprise solid state light emitters which, if illuminated, would emit light having a dominant wavelength in the range of from about 495 nm to about 580 nm (e.g., about 495 nm to about 500 nm, about 500 nm to about 505 nm, about 505 nm to about 510 nm, about 510 nm to about 520 nm, about 520 nm to about 530 nm, about 530 nm to about 540 nm, about 540 nm to about 550 nm, about 550 nm to about 560 nm, about 560 nm to about 570 nm, about 570 nm to about 580 nm, about 495 nm to about 570 nm, about 505 nm to about 580 nm, about 505 nm to about 570 nm, about 505 nm to about 560 nm, about 515 nm to about 570 nm, about 515 nm to about 560 nm, about 515 nm to about 550 nm, about 525 nm to about 560 nm, about 525 nm to about 550 nm, about 525 nm to about 540 nm, about 535 nm to about 550 nm, and/or about 535 nm to about 540 nm).

In embodiments according to the first, second and third aspects of the present inventive subject matter that include at least one lighting device that emits light selected from among at least one of BSG-1 light, BSG-2 light and BSG-3 light, the lighting device can further comprise solid state light emitters which, if illuminated, would emit light having a dominant wavelength in the range of from about 603 nm to about 800 nm or light within the third area on a 1931 CIE Chromaticity Diagram described above as defining BSR light, e.g., light having a dominant wavelength in the range of from about 603 nm to about 800 nm, about 610 nm to about 660 nm, about 615 nm to about 630 nm, about 615 nm to about 620 nm, about 620 nm to about 630 nm, about 603 nm to about 605 nm, about 605 nm to about 610 nm, about 610 nm to about 615 nm, about 620 nm to about 625 nm, about 625 nm to about 630 nm, about 630 nm to about 640 nm, about 640 nm to about 650 nm, about 650 nm to about 660 nm, about 660 nm to about 680 nm, about 680 nm to about 700 nm, about 700 nm to about 720 nm, about 720 nm to about 740 nm, about 740 nm to about 760 nm, about 760 nm to about 780 nm, about 780 nm to about 800 nm, about −495 nm to about −530 nm, about −495 nm to about −500 nm, about −500 nm to about −505 nm, about −505 nm to about −510 nm, about −510 nm to about −520 nm, about −520 nm to about −530 nm.

In accordance with a fourth aspect of the present inventive subject matter, there is provided a backlighting and/or edge-lighting device that comprises:

(1) at least one lighting device comprising a first group of solid state light emitters and at least a first luminescent material, wherein:

the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and the first luminescent material, if excited, would emit light having a dominant wavelength in the range of from about 555 nm to about 585 nm (e.g., about 555 nm to about 575 nm, about 565 nm to about 585 nm, and/or about 565 nm to about 575 nm); and (2) at least one of: (a) at least one light guide (e.g., a light guide that has first and second orthogonal dimensions that are at least twenty times its third orthogonal dimension), (b) at least one reflector (e.g., a reflector that has first and second orthogonal dimensions that are at least ten times its third orthogonal dimension), and (c) at least one light polarizer.

In accordance with a fifth aspect of the present inventive subject matter, there is provided an LCD device that comprises:

a plurality of liquid crystals; and at least one lighting device comprising a first group of solid state light emitters and at least a first luminescent material, wherein:

the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and the first luminescent material, if excited, would emit light having a dominant wavelength in the range of from about about 555 nm to about 585 nm (e.g., about 555 nm to about 575 nm, about 565 nm to about 585 nm, and/or about 565 nm to about 575 nm).

In accordance with a sixth aspect of the present inventive subject matter, there is provided an LCD having mounted therein or thereon at least one lighting device comprising a first group of solid state light emitters and at least a first luminescent material, wherein: (1) the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and (2) the first luminescent material, if excited, would emit light having a dominant wavelength in the range of from about about 555 nm to about 585 nm (e.g., about 555 nm to about 575 nm, about 565 nm to about 585 nm, and/or about 565 nm to about 575 nm).

In some embodiments according to any of the fourth, fifth and/or sixth aspects of the present inventive subject matter:

(a) at least a portion of the first luminescent material can be provided in at least a first lumiphor;

(b) if the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the first area on a 1931 CIE Chromaticity Diagram described above as defining BSY-1 light or the second area on a 1931 CIE Chromaticity Diagram described above as defining BSY-2 light;

(c) if the first group of solid state light emitters is illuminated and at least a portion of the first luminescent material is excited, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the first area or the second area on a 1931 CIE Chromaticity Diagram defined above;

(d) the lighting device can further comprise a second group of solid state light emitters which, if illuminated, would emit light having a dominant wavelength in the range of from about −495 nm to about −580 nm (e.g., about −495 nm to about −500 nm, about −500 nm to about −505 nm, about −505 nm to about −510 nm, about −510 nm to about −520 nm, about −520 nm to about −530 nm, about −530 nm to about −540 nm, about −540 nm to about −550 nm, about −550 nm to about −560 nm, about −560 nm to about −570 nm, about −570 nm to about −580 nm, about −495 nm to about −570 nm, about −505 nm to about −580 nm, about −505 nm to about −570 nm, about −505 nm to about −560 nm, about −515 nm to about −570 nm, about −515 nm to about −560 nm, about −515 nm to about −550 nm, about −525 nm to about −560 nm, about −525 nm to about −550 nm, about −525 nm to about −540 nm, about −535 nm to about −550 nm, and/or about −535 nm to about −540 nm);

(e) the lighting device can further comprise a second group of solid state light emitters which, if illuminated, would emit light having a dominant wavelength in the range of from about −495 nm to about −580 nm (e.g., about −495 nm to about −500 nm, about −500 nm to about −505 nm, about −505 nm to about −510 nm, about −510 nm to about −520 nm, about −520 nm to about −530 nm, about −530 nm to about −540 nm, about −540 nm to about −550 nm, about −550 nm to about −560 nm, about −560 nm to about −570 nm, about −570 nm to about −580 nm, about −495 nm to about −570 nm, about −505 nm to about −580 nm, about −505 nm to about −570 nm, about −505 nm to about −560 nm, about −515 nm to about −570 nm, about −515 nm to about −560 nm, about −515 nm to about −550 nm, about −525 nm to about −560 nm, about −525 nm to about −550 nm, about −525 nm to about −540 nm, about −535 nm to about −550 nm, and/or about −535 nm to about −540 nm), and if the first group of solid state light emitters is illuminated and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram; and/or (f) the lighting device can further comprise a second group of solid state light emitters which, if illuminated, would emit light having a dominant wavelength in the range of from about −495 nm to about −580 nm (e.g., about −495 nm to about −500 nm, about −500 nm to about −505 nm, about −505 nm to about −510 nm, about −510 nm to about −520 nm, about −520 nm to about −530 nm, about −530 nm to about −540 nm, about −540 nm to about −550 nm, about −550 nm to about −560 nm, about −560 nm to about −570 nm, about −570 nm to about −580 nm, about −495 nm to about −570 nm, about −505 nm to about −580 nm, about −505 nm to about −570 nm, about −505 nm to about −560 nm, about −515 nm to about −570 nm, about −515 nm to about −560 nm, about −515 nm to about −550 nm, about −525 nm to about −560 nm, about −525 nm to about −550 nm, about −525 nm to about −540 nm, about −535 nm to about −550 nm, and/or about −535 nm to about −540 nm), and if the first group of solid state light emitters is illuminated, at least a portion of the first luminescent material is excited and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram.

In accordance with a seventh aspect of the present inventive subject matter, there is provided a backlighting and/or edge-lighting device that comprises:

(1) at least one lighting device comprising a first group of solid state light emitters and at least a first luminescent material, wherein:

the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and the first luminescent material, if excited, would emit light having a dominant wavelength in the range of from about 595 nm to about 625 nm (e.g., about 595 nm to about 615 nm, about 595 nm to about 610 nm, about 605 nm to about 625 nm, and/or about 605 nm to about 615 nm); and (2) at least one of: (a) at least one light guide (e.g., a light guide that has first and second orthogonal dimensions that are at least twenty times its third orthogonal dimension), (b) at least one reflector (e.g., a reflector that has first and second orthogonal dimensions that are at least ten times its third orthogonal dimension), and (c) at least one light polarizer.

In accordance with an eighth aspect of the present inventive subject matter, there is provided an LCD device that comprises:

a plurality of liquid crystals; and at least one lighting device comprising a first group of solid state light emitters and at least a first luminescent material, wherein:

the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and the first luminescent material, if excited, would emit light having a dominant wavelength in the range of from about 595 nm to about 625 nm (e.g., about 595 nm to about 615 nm, about 595 nm to about 610 nm, about 605 nm to about 625 nm, and/or about 605 nm to about 615 nm).

In accordance with a ninth aspect of the present inventive subject matter, there is provided an LCD having mounted therein or thereon at least one lighting device comprising a first group of solid state light emitters and at least a first luminescent material, wherein: (1) the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and (2) the first luminescent material, if excited, would emit light having a dominant wavelength in the range of from about 595 nm to about 625 nm (e.g., about 595 nm to about 615 nm, about 595 nm to about 610 nm, about 605 nm to about 625 nm, and/or about 605 nm to about 615 nm).

In some embodiments according to any of the seventh, eighth and/or ninth aspects of the present inventive subject matter:

(a) at least a portion of the first luminescent material can be provided in at least a first lumiphor;

(b) if the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the third area on a 1931 CIE Chromaticity Diagram described above as defining BSR light;

(c) if the first group of solid state light emitters is illuminated and at least a portion of the first luminescent material is excited, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the third area on a 1931 CIE Chromaticity Diagram defined above;

(d) the lighting device can further comprise a second group of solid state light emitters which, if illuminated, would emit light having a dominant wavelength in the range of from about 495 nm to about 580 nm (e.g., about 495 nm to about 500 nm, about 500 nm to about 505 nm, about 505 nm to about 510 nm, about 510 nm to about 520 nm, about 520 nm to about 530 nm, about 530 nm to about 540 nm, about 540 nm to about 550 nm, about 550 nm to about 560 nm, about 560 nm to about 570 nm, about 570 nm to about 580 nm, about 495 nm to about 570 nm, about 505 nm to about 580 nm, about 505 nm to about 570 nm, about 505 nm to about 560 nm, about 515 nm to about 570 nm, about 515 nm to about 560 nm, about 515 nm to about 550 nm, about 525 nm to about 560 nm, about 525 nm to about 550 nm, about 525 nm to about 540 nm, about 535 nm to about 550 nm, and/or about 535 nm to about 540 nm);

(e) the lighting device can further comprise a second group of solid state light emitters which, if illuminated, would emit light having a dominant wavelength in the range of from about 495 nm to about 580 nm (e.g., about 495 nm to about 500 nm, about 500 nm to about 505 nm, about 505 nm to about 510 nm, about 510 nm to about 520 nm, about 520 nm to about 530 nm, about 530 nm to about 540 nm, about 540 nm to about 550 nm, about 550 nm to about 560 nm, about 560 nm to about 570 nm, about 570 nm to about 580 nm, about 495 nm to about 570 nm, about 505 nm to about 580 nm, about 505 nm to about 570 nm, about 505 nm to about 560 nm, about 515 nm to about 570 nm, about 515 nm to about 560 nm, about 515 nm to about 550 nm, about 525 nm to about 560 nm, about 525 nm to about 550 nm, about 525 nm to about 540 nm, about 535 nm to about 550 nm, and/or about 535 nm to about 540 nm), and if the first group of solid state light emitters is illuminated and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram; and/or (f) the lighting device can further comprise a second group of solid state light emitters which, if illuminated, would emit light having a dominant wavelength in the range of from about 495 nm to about 580 nm (e.g., about 495 nm to about 500 nm, about 500 nm to about 505 nm, about 505 nm to about 510 nm, about 510 nm to about 520 nm, about 520 nm to about 530 nm, about 530 nm to about 540 nm, about 540 nm to about 550 nm, about 550 nm to about 560 nm, about 560 nm to about 570 nm, about 570 nm to about 580 nm, about 495 nm to about 570 nm, about 505 nm to about 580 nm, about 505 nm to about 570 nm, about 505 nm to about 560 nm, about 515 nm to about 570 nm, about 515 nm to about 560 nm, about 515 nm to about 550 nm, about 525 nm to about 560 nm, about 525 nm to about 550 nm, about 525 nm to about 540 nm, about 535 nm to about 550 nm, and/or about 535 nm to about 540 nm), and if the first group of solid state light emitters is illuminated, at least a portion of the first luminescent material is excited and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram.

In accordance with a tenth aspect of the present inventive subject matter, there is provided a backlighting and/or edge-lighting device that comprises:

(1) at least one lighting device comprising a first group of solid state light emitters and at least a first luminescent material, wherein:
the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and
the first luminescent material, if excited, would emit light having a dominant wavelength in the range of from about 510 nm to about 560 nm (e.g., about 510 nm to about 550 nm, about 520 nm to about 560 nm, about 520 nm to about 550 nm, about 520 nm to about 540 nm, about 530 nm to about 550 nm, about 530 nm to about 540 nm, about 540 nm to about 560 nm, about 540 nm to about 550 nm and/or about 550 nm to about 560 nm); and (2) at least one of: (a) at least one light guide (e.g., a light guide that has first and second orthogonal dimensions that are at least twenty times its third orthogonal dimension), (b) at least one reflector (e.g., a reflector that has first and second orthogonal dimensions that are at least ten times its third orthogonal dimension), and (c) at least one light polarizer.

In accordance with an eleventh aspect of the present inventive subject matter, there is provided an LCD device that comprises:
a plurality of liquid crystals; and
at least one lighting device comprising a first group of solid state light emitters and at least a first luminescent material, wherein:
the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and
the first luminescent material, if excited, would emit light having a dominant wavelength in the range of from about 510 nm to about 560 nm (e.g., about 510 nm to about 550 nm, about 520 nm to about 560 nm, about 520 nm to about 550 nm, about 520 nm to about 540 nm, about 530 nm to about 550 nm, about 530 nm to about 540 nm, about 540 nm to about 560 nm, about 540 nm to about 550 nm and/or about 550 nm to about 560 nm).

In accordance with a twelfth aspect of the present inventive subject matter, there is provided an LCD having mounted therein or thereon at least one lighting device comprising a first group of solid state light emitters and at least a first luminescent material, wherein: (1) the first group of solid state light emitters, if illuminated, would emit light having a peak wavelength in the range of from about 430 nm to about 480 nm (e.g., about 430 nm to about 470 nm, about 440 nm to about 480 nm, about 440 nm to about 470 nm, about 440 nm to about 460 nm, about 450 nm to about 470 nm, and/or about 450 nm to about 460 nm); and (2) the first luminescent material, if excited, would emit light having a dominant wavelength in the range of from about 510 nm to about 560 nm (e.g., about 510 nm to about 550 nm, about 520 nm to about 560 nm, about 520 nm to about 550 nm, about 520 nm to about 540 nm, about 530 nm to about 550 nm, about 530 nm to about 540 nm, about 540 nm to about 560 nm, about 540 nm to about 550 nm and/or about 550 nm to about 560 nm).

In some embodiments according to any of the tenth, eleventh and/or twelfth aspects of the present inventive subject matter:

(a) at least a portion of the first luminescent material can be provided in at least a first lumiphor;

(b) if the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the fourth area on a 1931 CIE Chromaticity Diagram described above as defining BSG-1 light, the fifth area on a 1931 CIE Chromaticity Diagram described above as defining BSG-2 light, or the sixth area on a 1931 CIE Chromaticity Diagram described above as defining BSG-3 light;

(c) if the first group of solid state light emitters is illuminated and at least a portion of the first luminescent material is excited, a mixture of light exiting the lighting device which was emitted from the first group of solid state light emitters and light exiting the lighting device which was emitted from the first luminescent material would, in the absence of any additional light, have a first group mixed illumination having x, y color coordinates which define a point that is within the fourth area, the fifth area, or the sixth area on a 1931 CIE Chromaticity Diagram defined above;

(d) the lighting device can further comprise a second group of solid state light emitters which, if illuminated, would emit light having a dominant wavelength in the range of from about 603 nm to about 800 nm or light within the third area on a 1931 CIE Chromaticity Diagram described above as defining BSR light (e.g., light having a dominant wavelength in the range of from about 603 nm to about 800 nm, about 610 nm to about 660 nm, about 615 nm to about 630 nm, about 615 nm to about 620 nm, about 620 nm to about 630 nm, about 603 nm to about 605 nm, about 605 nm to about 610 nm, about 610 nm to about 615 nm, about 620 nm to about 625 nm, about 625 nm to about 630 nm, about 630 nm to about 640 nm, about 640 nm to about 650 nm, about 650 nm to about 660 nm, about 660 nm to about 680 nm, about 680 nm to about 700 nm, about 700 nm to about 720 nm, about 720 nm to about 740 nm, about 740 nm to about 760 nm, about 760 nm to about 780 nm, about 780 nm to about 800 nm, about −495 nm to about −530 nm, about −495 nm to about −500 nm, about −500 nm to about −505 nm, about −505 nm to about −510 nm, about −510 nm to about −520 nm, about −520 nm to about −530 nm);

(e) the lighting device can further comprise a second group of solid state light emitters which, if illuminated, would emit light having a dominant wavelength in the range of from about 603 nm to about 800 nm or light within the third area on a 1931 CIE Chromaticity Diagram described above as defining BSR light (e.g., light having a dominant wavelength in the range of from about 603 nm to about 800 nm, about 610 nm to about 660 nm, about 615 nm to about 630 nm, about 615 nm to about 620 nm, about 620 nm to about 630 nm, about 603 nm to about 605 nm, about 605 nm to about 610 nm, about 610 nm to about 615 nm, about 620 nm to about 625 nm, about 625 nm to about 630 nm, about 630 nm to about 640 nm, about 640 nm to about 650 nm, about 650 nm to about 660 nm, about 660 nm to about 680 nm, about 680 nm to about 700 nm, about 700 nm to about 720 nm, about 720 nm to about 740 nm, about 740 nm to about 760 nm, about 760 nm to about 780 nm, about 780 nm to about 800 nm, about −495 nm to about −530 nm, about −495 nm to about −500 nm, about −500 nm to about −505 nm, about −505 nm to about −510 nm, about −510 nm to about −520 nm, about −520 nm to about −530 nm), and if the first group of solid state light emitters is illuminated and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram; and/or (f) the lighting device can further comprise a second group of solid state light emitters which, if illuminated, would emit light having a dominant wavelength in the range of from about 603 nm to about 800 nm or light within the third area on a 1931 CIE Chromaticity Diagram described above as defining BSR light (e.g., light having a dominant wavelength in the range of from about 603 nm to about 800 nm, about 610 nm to about 660 nm, about 615 nm to about 630 nm, about 615 nm to about 620 nm, about 620 nm to about 630 nm, about 603 nm to about 605 nm, about 605 nm to about 610 nm, about 610 nm to about 615 nm, about 620 nm to about 625 nm, about 625 nm to about 630 nm, about 630 nm to about 640 nm, about 640 nm to about 650 nm, about 650 nm to about 660 nm, about 660 nm to about 680 nm, about 680 nm to about 700 nm, about 700 nm to about 720 nm, about 720 nm to about 740 nm, about 740 nm to about 760 nm, about 760 nm to about 780 nm, about 780 nm to about 800 nm, about −495 nm to about −530 nm, about −495 nm to about −500 nm, about −500 nm to about −505 nm, about −505 nm to about −510 nm, about −510 nm to about −520 nm, about −520 nm to about −530 nm), and if the first group of solid state light emitters is illuminated, at least a portion of the first luminescent material is excited and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram.

In accordance with a thirteenth aspect in accordance with the present inventive subject matter, there is provided a device (e.g., a backlighting and/or edge-lighting device, or an LCD device) comprising at least one light emitter that comprises at least one non-white phosphor light emitting diode (i.e., a light emitter that comprises at least a first solid state light emitter and at least a first luminescent material). In some embodiments in accordance with the thirteenth aspect in accordance with the present inventive subject matter, at least one non-white phosphor light emitting diode can emit BSY-1 light, BSY-2 light, BSR light, BSG-1 light, BSG-2 light and/or BSG-3 light.

In accordance with a fourteenth aspect in accordance with the present inventive subject matter, there is provided a device (e.g., a backlighting and/or edge-lighting device, or an LCD device) comprising (1) at least one light emitter that comprises at least one non-white phosphor light emitting diode (i.e., a light emitter that comprises at least a first light emitting diode and at least a first luminescent material), and (2) at least one light emitter that comprises at least one light emitting diode with no (or substantially no) luminescent material.

In some embodiments in accordance with the fourteenth aspect in accordance with the present inventive subject matter, the at least one light emitter that comprises at least one light emitting diode with no (or substantially no) luminescent material can be a light emitting diode that emits light of saturated color. The term "saturated", as used herein, means having a purity of at least 85%, the term "purity" having a well known meaning to persons skilled in the art, and procedures for calculating purity being well known to those of skill in the art.

In some embodiments in accordance with the fourteenth aspect in accordance with the present inventive subject matter, at least one non-white phosphor light emitting diode can emit BSY-1 light and/or BSY-2 light, and the at least one light emitter that comprises at least one light emitting diode with no (or substantially no) luminescent material can be a light emitting diode that emits light having a dominant wavelength in the range of from about −495 nm to about −580 nm (e.g., about −495 nm to about −500 nm, about −500 nm to about −505 nm, about −505 nm to about −510 nm, about −510 nm to about −520 nm, about −520 nm to about −530 nm, about −530 nm to about −540 nm, about −540 nm to about −550 nm, about −550 nm to about −560 nm, about −560 nm to about −570 nm, about −570 nm to about −580 nm, about −495 nm to about −570 nm, about −505 nm to about −580 nm, about −505 nm to about −570 nm, about −505 nm to about −560 nm, about −515 nm to about −570 nm, about −515 nm to about −560 nm, about −515 nm to about −550 nm, about −525 nm to about −560 nm, about −525 nm to about −550 nm, about −525 nm to about −540 nm, about −535 nm to about −550 nm, and/or about −535 nm to about −540 nm).

In some embodiments in accordance with the fourteenth aspect in accordance with the present inventive subject matter, at least one non-white phosphor light emitting diode can emit BSR light, and the at least one light emitter that comprises at least one light emitting diode with no (or substantially no) luminescent material can be a light emitting diode that emits light having a dominant wavelength in the range of from about 495 nm to about 580 nm (e.g., about 495 nm to about 500 nm, about 500 nm to about 505 nm, about 505 nm to about 510 nm, about 510 nm to about 520 nm, about 520 nm to about 530 nm, about 530 nm to about 540 nm, about 540 nm to about 550 nm, about 550 nm to about 560 nm, about 560 nm to about 570 nm, about 570 nm to about 580 nm, about 495 nm to about 570 nm, about 505 nm to about 580 nm, about 505 nm to about 570 nm, about 505 nm to about 560 nm, about 515 nm to about 570 nm, about 515 nm to about 560 nm, about 515 nm to about 550 nm, about 525 nm to about 560 nm, about 525 nm to about 550 nm, about 525 nm to about 540 nm, about 535 nm to about 550 nm, and/or about 535 nm to about 540 nm).

In some embodiments in accordance with the fourteenth aspect in accordance with the present inventive subject matter, at least one non-white phosphor light emitting diode can emit BSG-1 light, BSG-2 light and/or BSG-3 light, and the at least one light emitter that comprises at least one light emitting diode with no (or substantially no) luminescent material can be a light emitting diode that emits light having a dominant wavelength in the range of from about 603 nm to about 800 nm or light within the third area on a 1931 CIE Chromaticity Diagram described above as defining BSR light (e.g., light having a dominant wavelength in the range of from about 603 nm to about 800 nm, about 610 nm to about 660 nm, about 615 nm to about 630 nm, about 615 nm to about 620 nm, about 620 nm to about 630 nm, about 603 nm to about 605 nm, about 605 nm to about 610 nm, about 610 nm to about 615 nm, about 620 nm to about 625 nm, about 625 nm to about 630 nm, about 630 nm to about 640 nm, about 640 nm to about 650 nm, about 650 nm to about 660 nm, about 660 nm to about 680 nm, about 680 nm to about 700 nm, about 700 nm to about 720 nm, about 720 nm to about 740 nm, about 740 nm to about 760 nm, about 760 nm to about 780 nm, about 780 nm to about 800 nm, about −495 nm to about −530 nm, about −495 nm to about −500 nm, about −500 nm to about −505 nm, about −505 nm to about −510 nm, about −510 nm to about −520 nm, about −520 nm to about −530 nm).

The inventive subject matter may be more fully understood with reference to the accompanying drawings and the following detailed description of the inventive subject matter.

BRIEF DESCRIPTION OF THE DRAWING FIGURES

Figure 2:
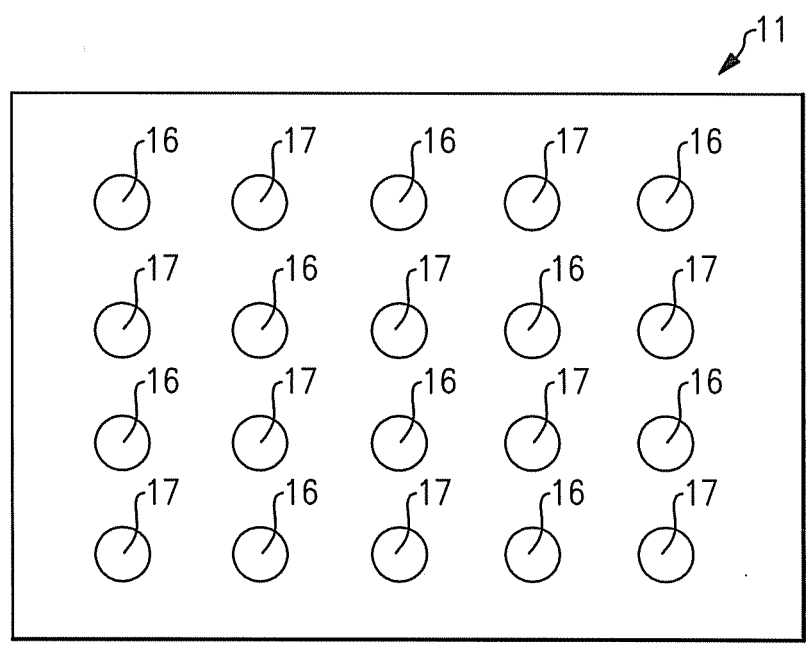
Figure 3:
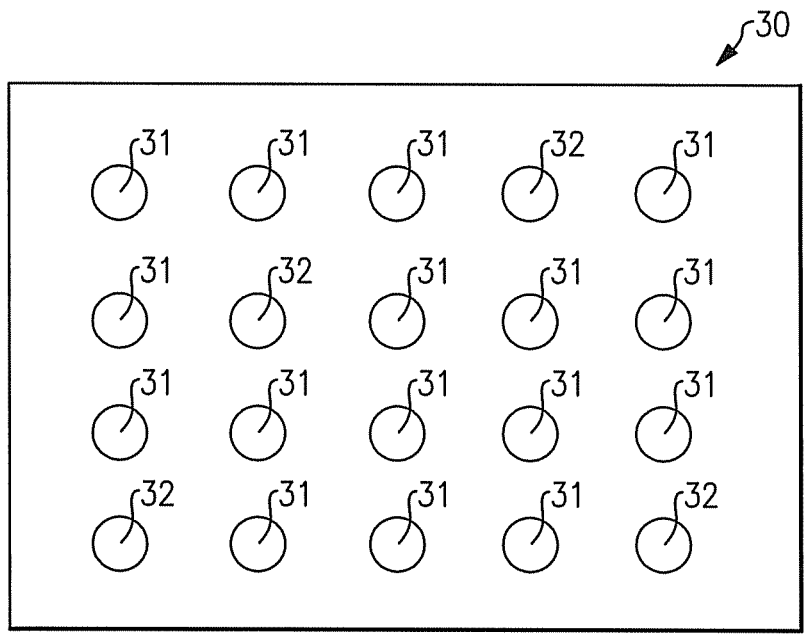
Figure 4:
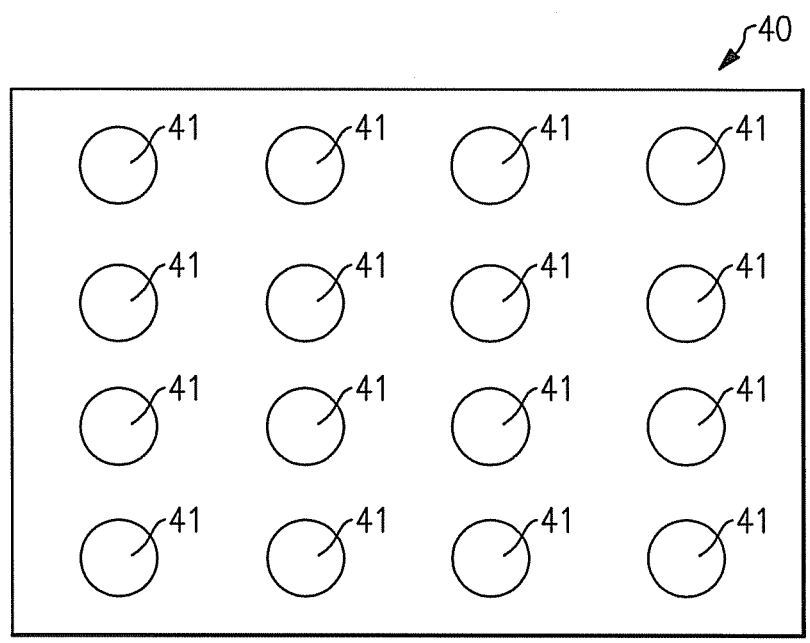
Figure 5:
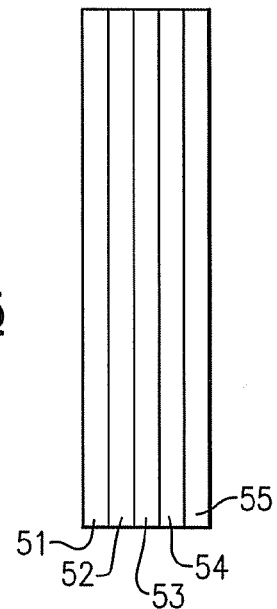
Figure 6:
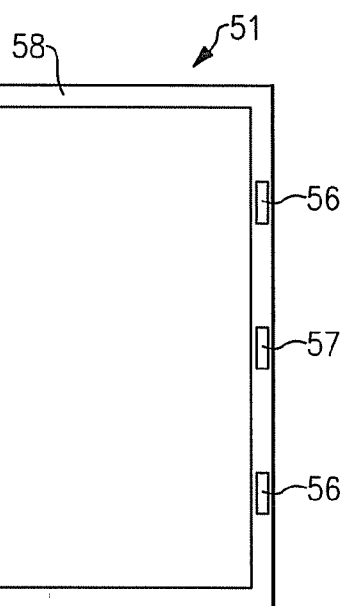
Figure 7:
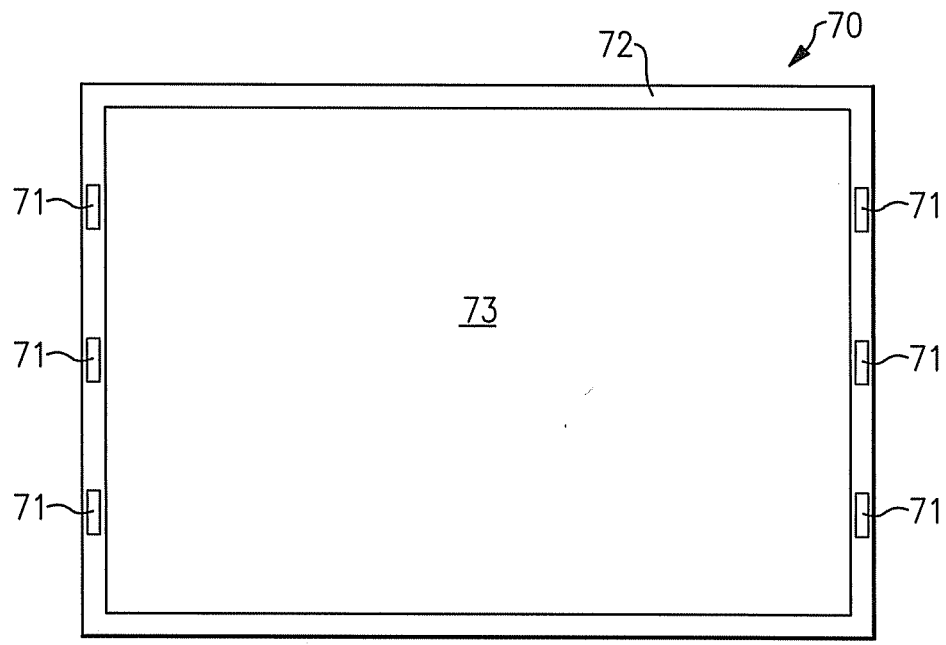
Figure 8:
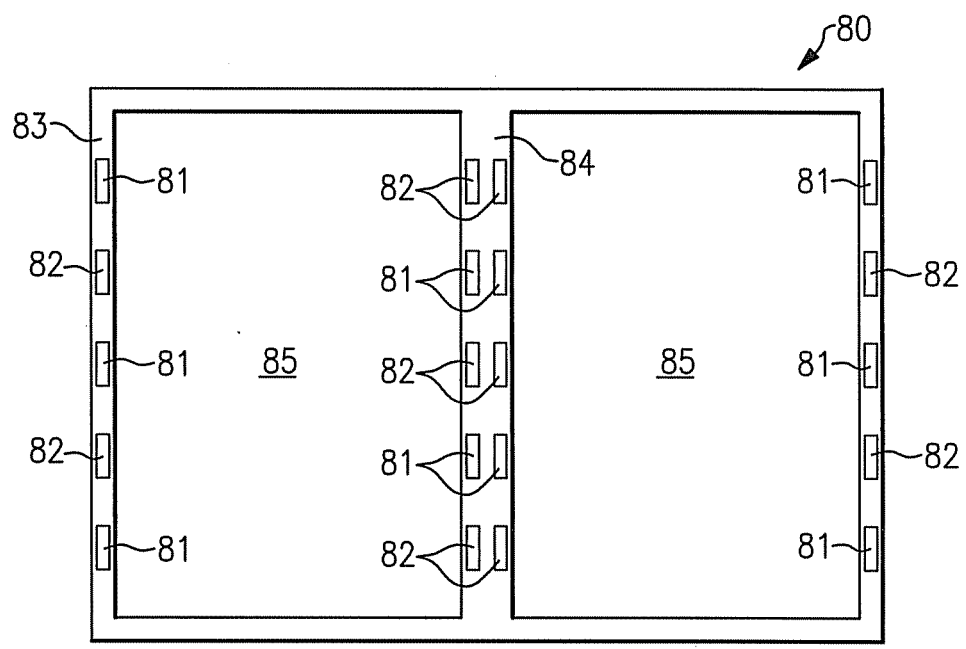
Figure 9:
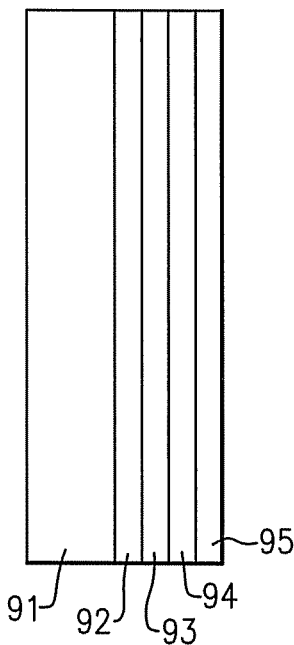
Figure 10:
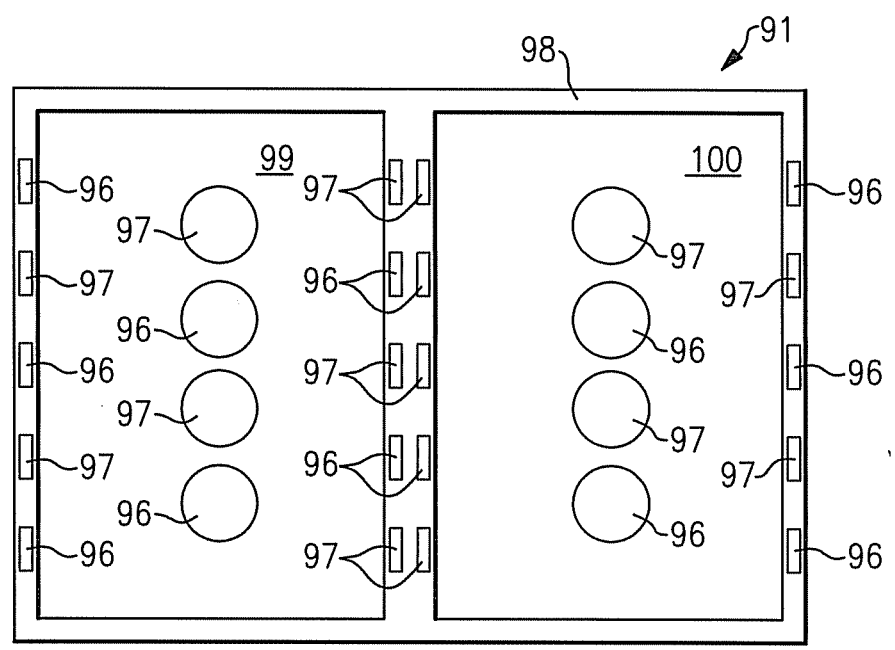
Figure 11:
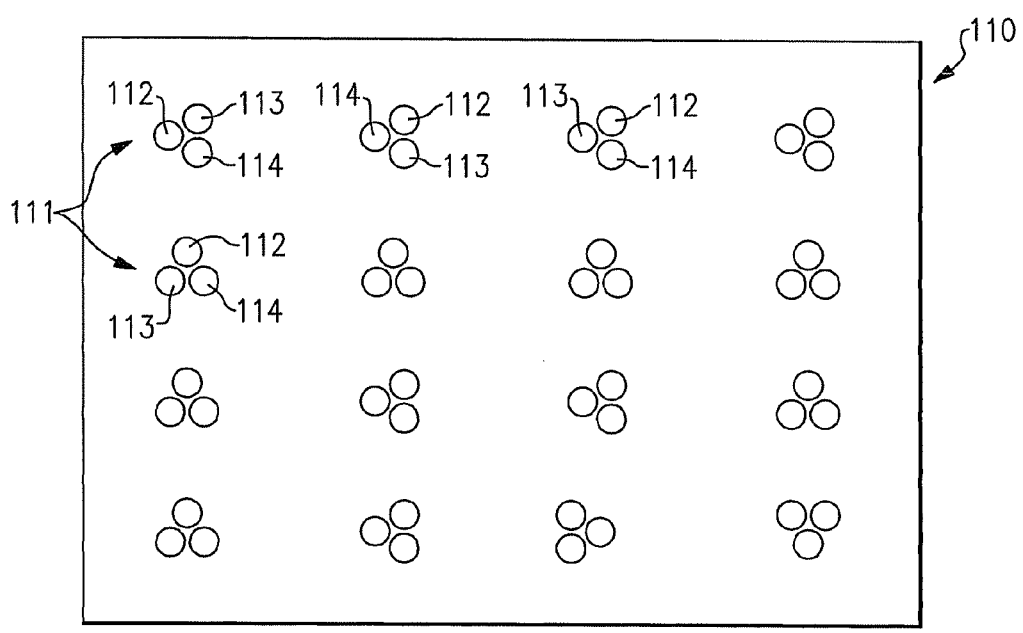

FIGS. 1 and 2 depict a backlit LCD device 10.
FIG. 3 depicts an alternative light emitter panel 30 for a backlit LCD device.
FIG. 4 depicts another alternative light emitter panel 40 for a backlit LCD device.
FIGS. 5 and 6 depict an edge-lit LCD device 50.
FIG. 7 depicts an alternative light emitter panel 70 for an edge-lit LCD device.
FIG. 8 depicts another alternative light emitter panel 80 for an edge-lit LCD device.
FIGS. 9 and 10 depict a combination backlighting and edge-lighting LCD device 90.
FIG. 11 depicts another alternative light emitter panel 110 for a backlit LCD device.

DETAILED DESCRIPTION

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on", being mounted "on", being mounted "to", or extending "onto" another element, it can be in or on the other element, and/or it can be directly on the other element, and/or it can extend directly onto the other element, and it can be in direct contact or indirect contact with the other element (e.g., intervening elements may also be present). In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

The expression "in contact with", as used herein, means that the first structure that is in contact with a second structure is in direct contact with the second structure or is in indirect contact with the second structure. The expression "in indirect contact with" means that the first structure is not in direct contact with the second structure, but that there are a plurality of structures (including the first and second structures), and each of the plurality of structures is in direct contact with at least one other of the plurality of structures (e.g., the first and second structures are in a stack and are separated by one or more intervening layers). The expression "direct contact", as used in the present specification, means that the first structure which is "in direct contact" with a second structure is touching the second structure and there are no intervening structures between the first and second structures at least at some location.

A statement herein that two components in a device are "electrically connected," means that there are no components electrically between the components that affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board, are electrically connected. A statement herein that two components in a device are "electrically connected" is distinguishable from a statement that the two components are "directly electrically connected", which means that there are no components electrically between the two components.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "lower", "bottom", "below", "upper", "top", "above," "horizontal" or "vertical" may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously, or intermittently at a rate such that a human eye would perceive it as emitting light continuously or intermittently, or where a plurality of solid state light emitters of the same color or different colors are emitting light intermittently and/or alternatingly (with or without overlap in "on" times) in such a way that a human eye would perceive them as emitting light continuously or intermittently (and, in some cases where different colors are emitted, as separate colors or as a mixture of those colors).

The expression "excited", as used herein when referring to luminescent material, means that at least some electromagnetic radiation (e.g., visible light, UV light or infrared light) is contacting the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials that emit light of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in accordance with various aspects of the present inventive subject matter, there are provided backlighting and/or edge-lighting devices (and in some aspects there are provided LCD devices) that comprise at least one lighting device that emits light selected from among at least one of BSY-1 light, BSY-2 light, BSR light, BSG-1 light, BSG-2 light and BSG-3 light.

Persons of skill in the art are familiar with, and have ready access to, a wide variety of light emitters of different colors, and any suitable light emitters can be employed in accordance with the present inventive subject matter.

The respective light emitters can be similar to one another, different from one another, or any combination (i.e., there can be a plurality of light emitters of one type (e.g., one or more types of solid state light emitters), or one or more light emitters of each of two or more types (e.g., one or more fluorescent light emitters and one or more solid state light emitters).

Some embodiments according to the present inventive subject matter can comprise one or more solid state light emitters (i.e., (1) in some embodiments in accordance with aspects of the present inventive subject matter that comprise one or more light emitters, one or more solid state light emitters can be employed as one or more of the light emitters; (2) in accordance with some aspects of the present inventive subject matter, there are provided backlighting and/or edge-lighting devices that comprise one or more solid state light emitters; and (3) in accordance with some aspects of the present inventive subject matter, there are provided LCD devices that comprise one or more solid state light emitters).

Persons of skill in the art are familiar with, and have ready access to, a wide variety of solid state light emitters, and any suitable solid state light emitters can be employed in the devices (i.e., backlighting and/or edge-lighting devices, or LCD devices) according to the present inventive subject matter. Representative examples of solid state light emitters include light emitting diodes (inorganic or organic, including polymer light emitting diodes (PLEDs)) and a wide variety of luminescent materials as well as combinations (e.g., one or more light emitting diodes and/or one or more luminescent materials). Solid state light emitters provided in any device according to the present inventive subject matter can be of any suitable size (or sizes), e.g., and any quantity (or respective quantities) of solid state light emitters of one or more sizes can be employed in the devices. Persons of skill in the art are familiar with, and have ready access to, solid state light emitters that emit light having a wide variety of emission spectra, including wavelength ranges, peak emission wavelengths and/or dominant emission wavelengths, and any of such solid state light emitters, or any combinations of such solid state light emitters, can be employed in embodiments that comprise one or more solid state light emitters.

The expression "dominant wavelength", is used herein according to its well known and accepted meaning to refer to the perceived color of a spectrum, i.e., the single wavelength of light which produces a color sensation most similar to the color sensation perceived from viewing light emitted by the light source (i.e., it is roughly akin to "hue"), as opposed to "peak wavelength", which is well known to refer to the spectral line with the greatest power in the spectral power distribution of the light source. Because the human eye does not perceive all wavelengths equally (it perceives yellow and green better than red and blue), and because the light emitted by many solid state light emitter (e.g., LEDs) is actually a range of wavelengths, the color perceived (i.e., the dominant wavelength) is not necessarily equal to (and often differs from) the wavelength with the highest power (peak wavelength). A truly monochromatic light such as a laser has the same dominant and peak wavelengths.

Solid state light emitters, such as LEDs, may be energy efficient, so as to satisfy ENERGY STAR® program requirements. ENERGY STAR program requirements for LEDs are defined in "*ENERGY STAR® Program Requirements for Solid State Lighting Luminaires, Eligibility Criteria—Version 1.1*", Final: Dec. 19, 2008, the disclosure of which is hereby incorporated herein by reference in its entirety as if set forth fully herein.

Light emitting diodes are semiconductor devices that convert electrical current into light. A wide variety of light emitting diodes are used in increasingly diverse fields for an ever-expanding range of purposes. More specifically, light emitting diodes are semiconducting devices that emit light (ultraviolet, visible, or infrared) when a potential difference is applied across a p-n junction structure. There are a number of well known ways to make light emitting diodes and many associated structures, and the present inventive subject matter can employ any such devices.

A light emitting diode produces light by exciting electrons across the band gap between a conduction band and a valence band of a semiconductor active (light-emitting) layer. The electron transition generates light at a wavelength that depends on the band gap. Thus, the color of the light (wavelength) and/or the type of electromagnetic radiation (e.g., infrared light, visible light, ultraviolet light, near ultraviolet light, etc., and any combinations thereof) emitted by a light emitting diode depends on the semiconductor materials of the active layers of the light emitting diode.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

In devices according to the present inventive subject matter that include two or more solid state light emitters, any of the solid state light emitters can be separately packaged, and/or two or more groups of two or more solid state light emitters can be combined in multiple-chip packages.

As noted above, some embodiments of devices according to the present inventive subject matter can comprise at least a first luminescent material.

A luminescent material is a material that emits a responsive radiation (e.g., visible light) when excited by a source of exciting radiation. In many instances, the responsive radiation has a wavelength that is different from the wavelength of the exciting radiation.

Luminescent materials can be categorized as being downconverting, i.e., a material that converts photons to a lower energy level (longer wavelength) or up-converting, i.e., a material that converts photons to a higher energy level (shorter wavelength).

Persons of skill in the art are familiar with, and have ready access to, a variety of luminescent materials that emit light having a variety of peak emission wavelengths, dominant emission wavelengths and hues, and any of such luminescent materials, or any combinations of such luminescent materials, can be employed, if desired.

One type of luminescent material are phosphors, which are readily available and well known to persons of skill in the art. Other examples of luminescent materials include scintillators, day glow tapes and inks that glow in the visible spectrum upon illumination with ultraviolet light.

In devices that comprise one or more luminescent materials, the luminescent material(s) can be provided in any suitable form. For example, one or more luminescent materials can be provided in the form of one or more lumiphors (i.e., structures in which one or more luminescent materials are embedded in a resin, i.e., a polymeric matrix, such as a silicone material, an epoxy material, a glass material or a metal oxide material, and/or in which one or more luminescent materials are applied to one or more surfaces of a resin).

It is well known that light emitters that emit light of differing hues can be combined to generate mixtures of light that have desired hues (e.g., non-white light corresponding to desired color points or white light of desired color temperature, etc.). It is also well known that the color point produced by mixtures of colors can readily be predicted and/or designed using simple geometry on a CIE Chromaticity Diagram. It is further well known that starting with the notion of a desired mixed light color point, persons of skill in the art can readily select light emitters of different hues that will, when mixed, provide the desired mixed light color point. For example, persons of skill in the art can select a first light emitter (e.g., a light emitting diode with phosphor), plot the color point of the light it emits on a CIE Chromaticity Diagram, plot a desired range of color points (or a single desired color point) for mixed light, draw one or more line segments through the desired range of color points (or the single color point) for the mixed light such that the line segment(s) extend beyond the desired color point(s), and identify one or more second light emitters (e.g., a light emitting diode, a phosphor material, or a combination thereof) that emit light of color point(s) through which the line segment(s) pass (on a side of the desired mixed color point(s) that is opposite the color point of the first light emitter). The result is a plot of a line segment that originates at the color point for the first light emitter, that passes through the desired mixed light color point (or one of the range for the desired mixed light color point), and that terminates at the color point for the second light emitter. When the first light emitter and the second light emitter are energized so that they emit light, the color point of the mixed light will necessarily lie along the line segment, and the location of the color point of the mixed light along the line segment will be dictated by (namely, proportional to) the relative brightnesses of the respective light emitted from the first and second light emitters. That is, the greater the proportion of the mixed light that is from the second light emitter, the closer the color point is to the color point of the second light emitter; this relationship is geometrically proportional, i.e., the fraction of the length of the line segment that the color point of the mixed light is spaced from the color point of the first light emitter is equal to the fraction of the mixed light that is from the second light emitter (and vice-versa), or, in geometric terms, the ratio of (1) the distance from the color point of the first light emitter to the color point of the mixed light, divided by (2) the distance from the color point of the first light emitter to the color point of the second light emitter will be equal to the ratio of the brightness (in lumens) of the first light emitter divided by the brightness (in lumens) of the combination of light in the mixed light. Accordingly, once one identifies light emitters that provide the endpoints of a line segment that extends through the desired mixed light color point, the desired mixed light color point can be obtained by calculating the relative brightnesses of the first and second light emitters necessary to arrive at the desired mixed light color point.

Where more than two light emitters are used (i.e., where there are mixed light of a first color point from a first light emitter, light of a second color point from a second light emitter, and light of a third color point from a third light emitter), the geometrical relationships can be used to ensure that the desired mixed light color point is obtained (e.g., conceptually the color point of a sub-mixture of light from the first light emitter and the second light emitter can be determined, and then the color point of a mixture of sub-mixture (having a brightness of the combined brightnesses of the first light emitter and the second light emitter) and the third light emitter can be determined), and the range of mixed light color points that can be reached is defined by the perimeter obtained from drawing lines connecting the respective color points of the light emitters.

In general, light of any number of colors can be mixed in the backlighting devices, the edge-lighting devices and the LCD devices in accordance with the present inventive subject matter. Representative examples of blending of light colors are described in:

U.S. patent application Ser. No. 11/613,714, filed Dec. 20, 2006 (now U.S. Patent Publication No. 2007/0139920), the entirety of which is hereby incorporated by reference as if set forth in its entirety;

U.S. patent application Ser. No. 11/613,733, filed Dec. 20, 2006 (now U.S. Patent Publication No. 2007/0137074) the entirety of which is hereby incorporated by reference as if set forth in its entirety;

U.S. patent application Ser. No. 11/736,761, filed Apr. 18, 2007 (now U.S. Patent Publication No. 2007/0278934), the entirety of which is hereby incorporated by reference as if set forth in its entirety;

U.S. patent application Ser. No. 11/736,799, filed Apr. 18, 2007 (now U.S. Patent Publication No. 2007/0267983), the entirety of which is hereby incorporated by reference as if set forth in its entirety;

U.S. patent application Ser. No. 11/737,321, filed Apr. 19, 2007 (now U.S. Patent Publication No. 2007/0278503), the entirety of which is hereby incorporated by reference as if set forth in its entirety;

U.S. patent application Ser. No. 11/936,163, filed Nov. 7, 2007 (now U.S. Patent Publication No. 2008/0106895), the entirety of which is hereby incorporated by reference as if set forth in its entirety;

U.S. patent application Ser. No. 12/117,122, filed May 8, 2008 (now U.S. Patent Publication No. 2008/0304260), the entirety of which is hereby incorporated by reference as if set forth in its entirety;

U.S. patent application Ser. No. 12/117,131, filed May 8, 2008 (now U.S. Patent Publication No. 2008/0278940), the entirety of which is hereby incorporated by reference as if set forth in its entirety;

U.S. patent application Ser. No. 12/117,136, filed May 8, 2008 (now U.S. Patent Publication No. 2008/0278928), the entirety of which is hereby incorporated by reference as if set forth in its entirety;

U.S. Pat. No. 7,213,940, issued on May 8, 2007, the entirety of which is hereby incorporated by reference as if set forth in its entirety;

U.S. Patent Application No. 60/868,134, filed on Dec. 1, 2006, entitled "LIGHTING DEVICE AND LIGHTING METHOD" (inventors: Antony Paul van de Ven and Gerald H. Negley; the entirety of which is hereby incorporated by reference as if set forth in its entirety;

U.S. patent application Ser. No. 11/948,021, filed on Nov. 30, 2007 (now U.S. Patent Publication No. 2008/0130285), the entirety of which is hereby incorporated by reference as if set forth in its entirety;

U.S. patent application Ser. No. 12/475,850, filed on Jun. 1, 2009 (now U.S. Patent Publication No. 2009-0296384), the entirety of which is hereby incorporated by reference as if set forth in its entirety;

U.S. patent application Ser. No. 12/248,220, filed on Oct. 9, 2008 (now U.S. Patent Publication No. 2009/0184616), the entirety of which is hereby incorporated by reference as if set forth in its entirety;

U.S. patent application Ser. No. 11/951,626, filed Dec. 6, 2007 (now U.S. Patent Publication No. 2008/0136313), the entirety of which is hereby incorporated by reference as if set forth in its entirety;

U.S. patent application Ser. No. 12/035,604, filed on Feb. 22, 2008 (now U.S. Patent Publication No. 2008/0259589), the entirety of which is hereby incorporated by reference as if set forth in its entirety;

U.S. patent application Ser. No. 12/117,148, filed May 8, 2008 (now U.S. Patent Publication No. 2008/0304261), the entirety of which is hereby incorporated by reference as if set forth in its entirety;

U.S. Patent Application No. 60/990,435, filed on Nov. 27, 2007, entitled "WARM WHITE ILLUMINATION WITH HIGH CRI AND HIGH EFFICACY" (inventors: Antony Paul van de Ven and Gerald H. Negley; the entirety of which is hereby incorporated by reference as if set forth in its entirety;

U.S. patent application Ser. No. 12/535,319, filed on Aug. 4, 2009 (now U.S. Pat. No. 2011/0031894), the entirety of which is hereby incorporated by reference as if set forth in its entirety; and U.S. patent application Ser. No. 12/541,215, filed on Aug. 14, 2009 (now U.S. Pat. No. 2011/0037409), the entirety of which is hereby incorporated by reference as if set forth in its entirety.

Solid state light emitters can be mounted in any suitable way, e.g., by using chip on heat sink mounting techniques, by soldering (e.g., if the solid state light emitters are mounted on a metal core printed circuit board (MCPCB), flex circuit or even a standard PCB, such as an FR4 board), for example, solid state light emitters can be mounted using substrate techniques such as from Thermastrate Ltd of Northumberland, UK. If desired, the surface(s) on which one or more solid state light emitters are mounted can be machined or otherwise fainted to be of matching topography, e.g., to provide high heat sink surface area.

Structure(s) on which solid state light emitters are mounted can be made of any suitable material (or combination of materials), and persons of skill in the art are familiar with a variety of suitable materials. For example, in some embodiments, solid state light emitters can be mounted on any suitable material that has relatively high heat conductivity, e.g., aluminum, copper. aluminum nitride (AlN), silicon carbide (SiC), diamond-like carbon (DLC), etc. Structure(s) on which solid state light emitters are mounted can be made of the same material or combination of materials, or any one or more of the respective structuress can be made of different materials (or combinations of materials).

A variety of liquid crystal display devices (LCD devices or LCDs) are known to those of skill in the art, and display devices in accordance with the present inventive subject matter can correspond to any of these types of devices. For example, a typical LCD can comprise one or more light emitters, a color filter panel, a horizontal polarizing filter panel, a positive electrode layout, a liquid crystal matrix structure comprising nematic liquid crystals, a negative electrode layout and a vertical polarizing filter panel (and optionally one or more light guides).

In backlit LCD devices, light is emitted from light emitters behind the liquid crystals (relative to the viewing screen), whereas in edge-lit LCD devices (also known as side-lit LCD devices or LCD devices with "sidelighting"), light emitters are along one or more edges of the viewing screen. Some LCD devices can have both backlighting and edge-lighting in any suitable relative amounts.

Light emitters (for example, light emitting diodes) in backlighting devices or in backlit LCD devices (or in devices that include at least some backlighting, e.g., devices that include both backlighting and edge-lighting) can be arranged in any suitable pattern. For instance, in some embodiments, light emitters in backlit LCD devices can be in a grid pattern, with a plurality of substantially parallel rows and a plurality of substantially parallel columns spaced from each other (or in contact with each other) by any suitable distance (or respective distances between different rows and/or different columns). In devices that include at least some backlighting with plural light emitters, the light emitters can be arranged in an ordered pattern (e.g., an array in which columns and rows are aligned or are offset from each other by regular distances) or a non-ordered pattern (e.g., a pattern that does not include regular rows and/or does not include regular columns), and/or in any such devices that include light emitters that emit light of at least two respective colors, the light emitters of the respective colors can be arranged in a repeating pattern or not in a repeating pattern, and/or can be symmetrical or asymmetrical.

Light emitters (for example, light emitting diodes) in edge-lighting devices or in edge-lit LCD devices (or in devices that include at least some edge-lighting) can be in contact with each other or spaced from each other along any number of edges of a substantially rectangular viewing screen, with the spacing being of any suitable size, such as 1 mm to 2.5 cm of space between adjacent light emitters, and different adjacent light emitters can be in contact with each other or spaced from each other by differing distances, and one or more light guides sends light emitted by these light emitters to various locations inside the edges of the viewing screen (i.e., generally to various locations toward the center of the viewing screen). In devices that include at least some edge-lighting with light emitters that emit light of at least two respective colors, the light emitters of the respective colors can be arranged in a repeating pattern or not in a repeating pattern, and/or can be symmetrical or asymmetrical.

Persons of skill in the LCD art have ready access to and are familiar with a variety of color filters, polarizing filters, electrode layouts, liquid crystal matrices that can be employed in making LCD devices (as well as other components that can be employed in making LCD devices, such as light guides and reflectors), and skilled artisans are familiar with techniques for forming such components and designs for assembling such components into LCD devices, and any of such components, techniques and designs can be employed in making backlighting devices, edge-lighting devices and LCD devices according to the present inventive subject matter.

The expressions "backlighting device" and "edge-lighting device", as used herein, refer to devices that can be employed in making other devices, e.g., display devices such as LCD devices. The expressions "backlighting device" and "edge-lighting device" are used to refer to combinations of components that can be used to provide light, e.g., for display devices that require (or that can be enhanced with) backlighting and/or edge-lighting.

As noted above, any of a wide variety of light emitters can be included in the backlighting devices, the edge-lighting devices and the LCD devices in accordance with the present inventive subject matter.

In some embodiments of edge-lighting devices (and in some embodiments of LCD devices that comprise edge-lighting) in accordance with the present inventive subject matter, one or more lateral-emitting light emitters (e.g., one or more sidelooker light emitting diodes, one or more side emitter light emitting diodes (i.e., light emitting diodes that have an hourglass shape above the chip to assist in causing light emitted by the light emitting diode to travel laterally) and/or one or more edge emitting diodes (E LEDs)) can be employed. Persons of skill in the art are familiar with such lateral-emitting light emitters (for example, sidelooker light emitting diodes are well known), and any of such lateral-emitting light emitters can be used in accordance with the present inventive subject matter.

Lateral-emitting light emitters are capable of emitting light in a substantially lateral direction. In some cases, the light emitted from a lateral-emitting light emitter, e.g., a sidelooker, is almost cosine in distribution. In some cases, at least some of the time, light is generally stretched along an axis parallel with the input face/edge of a light guide or cavity. In many instances, the area of the edge of a light guide (where the light is to be input) is greater than the emitter aperture area (i.e., the area from which light is emitted from the lateral-emitting light emitter). Lateral-emitting light emitters can be any suitable shape, e.g., rectangular, square, round, etc. In some cases, one or more lateral-emitting light emitters (e.g., one or more sidelookers) is/are placed in proximity to an edge of a light guide and the light is coupled across from the emitter to the light guide via a small air gap, and/or the edge of the light guide can be shaped with recesses, dimples and/or one or more cutouts) to capture more of the high angle light.

In some embodiments of devices that comprise edge-lighting and/or backlighting (and in some embodiments of LCD devices that comprise edge-lighting and/or backlighting) in accordance with the present inventive subject matter, at least 50 percent of light emitted from a lateral-emitting light emitter (or plural lateral-emitting light emitters) is emitted toward a region of a light guide.

In some embodiments of devices that comprise edge-lighting and/or backlighting (and in some embodiments of LCD devices that comprise edge-lighting and/or backlighting) in accordance with the present inventive subject matter, at least 50 percent of light emitted from a lateral-emitting light emitter (or plural lateral-emitting light emitters) is emitted in a direction that is within 30 degrees of a plane defined by a surface on which the lateral-emitting light emitter is mounted.

In some embodiments of devices that comprise edge-lighting and/or backlighting (and in some embodiments of LCD devices that comprise edge-lighting and/or backlighting) in accordance with the present inventive subject matter, at least 50 percent of light emitted from a lateral-emitting light emitter (or plural lateral-emitting light emitters) is emitted in a direction that is within 30 degrees of a plane defined by a surface of a light guide into which at least 50 percent of the light emitted from the lateral-emitting light emitter enters.

In some embodiments of backlighting devices (and in some embodiments of LCD devices that comprise backlighting) in accordance with the present inventive subject matter, one or more surface emitting light emitting diodes can be employed. Persons of skill in the art are familiar with surface emitting light emitting diodes, and any of such surface light emitting diodes can be used in accordance with the present inventive subject matter. In some embodiments, at least 50 percent of light emitted from a surface emitting light emitting diode is emitted from a major surface of the surface emitting light emitting diode (e.g., a surface that comprises at least 25 percent, and in some cases at least 40 percent, of the overall surface area of the surface emitting light emitting diode).

In some embodiments of devices that comprise edge-lighting and/or backlighting (and in some embodiments of LCD devices that comprise edge-lighting and/or backlighting) in accordance with the present inventive subject matter, one or more surface emitting light emitting diodes and/or one or more lateral-emitting light emitters (e.g., one or more sidelooker light emitting diodes) can be employed.

Some embodiments of devices that comprise edge-lighting and/or backlighting (and some embodiments of LCD devices that comprise edge-lighting and/or backlighting) in accordance with the present inventive subject matter comprise one or more surface emitting light emitting diodes that emit at least some light that travels directly to another component of a display device, e.g., to a filter, without traveling through a light guide, and/or one or more lateral-emitting light emitters that emit at least some light that travels through a light guide en route to another component of a display device (i.e., indirectly to the other component of the display device), e.g., to a filter.

In some embodiments of devices that comprise edge-lighting and/or backlighting (and in some embodiments of LCD devices that comprise edge-lighting and/or backlighting) in any or all of the edge-lighting and/or backlighting can be supplied directly, and/or any or all of the edge-lighting and/or backlighting can be supplied indirectly.

Persons of skill in the art are familiar with a wide variety of electrical contact regions (e.g., for providing electrical current to solid state light emitters), and any of such electrical contact regions can be employed in accordance with the present inventive subject matter. Electrical contact regions can be made of any suitable electrically conductive material (or combinations of materials), a wide variety of which are well known to persons skilled in the art. Electrical contact regions can be of any suitable size and shape, a variety of which are well known to those of skill in the art.

Electrical current can be supplied to light emitters and/or to other components (e.g., the nematic liquid crystals) of the backlighting devices, the edge-lighting devices and/or the LCD devices in accordance with the present inventive subject matter in any suitable way, a variety of which are well known to persons skilled in the art (e.g., wall plugs, conductive elements, power supplies, circuitry, electrical contacts, etc.).

In some embodiments, which can include or not include, as suitable, any of the other features described herein, a sensor (e.g., a color sensor and/or a temperature sensor, such as a thermistor) can be in any suitable location.

Persons of skill in the art are familiar with a wide variety of color sensors, and any of such sensors can be employed in devices in accordance with the present inventive subject matter. Among these well known sensors are sensors that are sensitive to all visible light, as well as sensors that are sensitive to only a portion of visible light. For example, the sensor can be a unique and inexpensive sensor (GaP:N light emitting diode) that views the entire light flux but is only (optically) sensitive to one or more of a plurality of light emitting diodes. For instance, in one specific example, the sensor can be sensitive to only a particular range (or ranges) of wavelengths, and the sensor can provide feedback to one or more light emitters (e.g., light emitting diodes that emit light of that color or that emit light of other colors) for color consistency as the light emitters age (e.g., if light output decreases). By using a sensor that monitors output selectively (by color), the output of one color can be selectively controlled to maintain the proper ratios of outputs and thereby maintain the color output of the device. This type of sensor is excited by only light having wavelengths within a particular range, e.g., a range that excludes red light.

Other techniques for sensing changes in light output of light emitters include providing separate or reference light emitters and a sensor that measures the light output of these light emitters. These reference light emitters can be placed so as to be isolated from ambient light. Additional techniques for sensing the light output of a light emitter include measuring ambient light and light output of one or more light emitters and then compensating the measured light output of the light emitter based on the measured ambient light.

Some embodiments in accordance with the present inventive subject matter can employ at least one temperature sensor. Persons of skill in the art are familiar with, and have ready access to, a variety of temperature sensors (e.g., thermistors), and any of such temperature sensors can be employed in embodiments in accordance with the present inventive subject matter. Temperature sensors can be used for a variety of purposes, e.g., to provide feedback information to compensation circuitry, e.g., to current adjusters.

In some embodiments, one or more temperature sensors (e.g., a single temperature sensor or a network of temperature sensors) can be provided which are in contact with one or more solid state light emitters (or on a surface on which one or more solid state light emitters are mounted), or are close to one or more solid state light emitters (e.g., less than ¼ inch away), such that the temperature sensor(s) provide accurate readings of the temperature of the solid state light emitter(s).

In some embodiments, one or more temperature sensors (e.g., a single temperature sensor or a network of temperature sensors) can be provided which are not in contact with one or more solid state light emitters, and are not close to one or more solid state light emitters, but are spaced from a solid state light emitter (or solid state light emitters) by only structure (or structures) having low thermal resistance, such that the temperature sensor(s) provide accurate readings of the temperature of the solid state light emitter(s).

In some embodiments, one or more temperature sensors (e.g., a single temperature sensor or a network of temperature sensors) can be provided which are not in contact with one or more solid state light emitters, and are not close to one or more solid state light emitters, but the arrangement is such that the temperature at the temperature sensor(s) is proportional to the temperature at the solid state light emitter(s), or the temperature at the temperature sensor(s) varies in proportion to the variance of temperature at the solid state light emitter(s), or the temperature at the temperature sensor(s) is correlatable to the temperature at the solid state light emitter(s).

A wide variety of compensation circuits are known, and any can be employed in the devices according to the present inventive subject matter. For example, a compensation circuit may comprise a digital controller, an analog controller or a combination of digital and analog. For example, a compensation circuit may comprise an application specific integrated circuit (ASIC), a microprocessor, a microcontroller, a collection of discrete components or combinations thereof. In some embodiments, a compensation circuit may be programmed to control one or more light emitters. In some embodiments, control of one or more light emitters may be provided by the circuit design of the compensation circuit and is, therefore, fixed at the time of manufacture. In still further embodiments, aspects of the compensation circuit, such as reference voltages, resistance values or the like, may be set at the time of manufacture so as to allow adjustment of the control of the one or more solid state light emitters without the need for programming or control code.

In some embodiments, which can include or not include, as suitable, any of the other features described herein, lighting devices (or lighting device elements) according to the present inventive subject matter can include any suitable thermal management solutions, a wide variety of which are well known to those of skill in the art.

In some embodiments, which can include or not include, as suitable, any of the other features described herein, any component (or components) can comprise one or more heat dissipation structures, e.g., fins, pins and/or texturing.

Some embodiments of devices according to the present inventive subject matter can have only passive cooling. On the other hand, some embodiments of devices according to the present inventive subject matter can have active cooling (and can optionally also have any of the passive cooling features described herein). The expression "active cooling" is used herein in a manner that is consistent with its common usage to refer to cooling that is achieved through the use of some form of energy, as opposed to "passive cooling", which is achieved without the use of energy (i.e., while energy is supplied to certain components, e.g., one or more light emitters, passive cooling is the cooling that would be achieved without the use of any component(s) that would require additional energy in order to function to provide additional cooling). In some embodiments of the present inventive subject matter, therefore, cooling is achieved with only passive cooling, while in other embodiments of the present inventive subject matter, active cooling is provided.

In embodiments where active cooling is provided, any type of active cooling can be employed, e.g., blowing or pushing (or assisting in blowing) an ambient fluid (such as air) across or near one or more heat dissipation elements or heat sinks, thermoelectric cooling, phase change cooling (including supplying energy for pumping and/or compressing fluid), liquid cooling (including supplying energy for pumping, e.g., water, liquid nitrogen or liquid helium), magnetoresistance, etc.

In some embodiments, which can include or not include, as suitable, any of the other features described herein, one or more heat spreaders can be provided in order to move heat away from one or more regions to one or more heat sink regions and/or one or more heat dissipation regions, and/or the heat spreader can itself provide surface area from which heat can be dissipated. Persons of skill in the art are familiar with a variety of materials that would be suitable for use in making a heat spreader, and any of such materials (e.g., copper, aluminum, etc.) can be employed.

Heat transfer from one structure or region of one component to another can be enhanced (i.e., thermal resistivity can be reduced or minimized) using any suitable material or structure for doing so, a variety of which are known to persons of skill in the art, e.g., by means of chemical or physical bonding and/or by interposing a heat transfer aid such as a thermal pad, thermal grease, graphite sheets, etc.

In some embodiments according to the present inventive subject matter, a portion (or portions) of any component can comprise one or more thermal transfer region(s) that has/have an elevated heat conductivity (e.g., higher than the rest of that component. A thermal transfer region (or regions) can be made of any suitable material, and can be of any suitable shape. Use of materials having higher heat conductivity in making the thermal transfer region(s) generally provides greater heat transfer, and use of thermal transfer region(s) of larger surface area and/or cross-sectional area generally provides greater heat transfer. Representative examples of materials that can be used to make the thermal transfer region(s), if provided, include metals, diamond, DLC, etc. Representative examples of shapes in which the thermal transfer region(s), if provided, can be formed include bars, slivers, slices, crossbars, wires and/or wire patterns. A thermal transfer region (or regions), if included, can also function as one or more pathways for carrying electricity, if desired.

In some embodiments, which can include or not include, as suitable, any of the other features described herein, any structure (e.g., circuitry and/or support structure and/or one or more circuit boards) that is located where some light emitted by the one or more light emitters is directed (continuously or intermittently or occasionally), can be made more reflective, e.g., by painting it white.

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as being limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

FIGS. 1 and 2 depict a backlit LCD device 10 in accordance with the present inventive subject matter. Referring to FIG. 1, the LCD device comprises a light emitter panel 11 (on which are mounted a plurality of light emitters 16 and 17, visible in FIG. 2), a color filter panel 12, a horizontal polarizing filter panel 13, a liquid crystal matrix panel 14 and a vertical polarizing filter panel 15. FIG. 2 is a view taken between the color filter panel 12 and the light emitter panel 11, rotated 90 degrees about a center vertical axis in FIG. 1 and looking toward the light emitter panel 11, showing the layout of the light emitters 16 and 17. The light emitters 16 and 17 can be solid state light emitters, comprising a plurality of solid state light emitters 16 that emit BSY-1 light and a plurality of solid state light emitters 17 that emit light having a dominant wavelength in the range of from about −495 nm to about −580 nm. The solid state light emitters 16 each comprise at least one light emitting diode and luminescent material. The solid state light emitters 17 each comprise at least one light emitting diode and no (or substantially no) luminescent material. In the arrangement depicted in FIG. 2, the light emitters 16 and 17 are arranged in a grid pattern, with a plurality of substantially parallel rows and a plurality of substantially parallel columns, and the light emitters 16 and 17 are arranged in a repeating pattern, i.e., along each row, the light emitters 16 and 17 alternate, and along each column, the light emitters 16 and 17 alternate. While the arrangement depicted in FIG. 2 includes five columns and four rows, the devices in accordance with the present inventive subject matter can have any suitable number of columns and any suitable number of rows (and if the light emitters are not arranged in rows and/or columns, any suitable number of light emitters) (typical devices include a much larger number of rows, columns and/or light emitters).

FIG. 3 depicts an alternative light emitter panel 30 for a backlit LCD device, comprising a plurality of solid state light emitters 31 that emit BSY-1 light and a plurality of solid state light emitters 32 that emit light having a dominant wavelength in the range of from about −495 nm to about −580 nm. The solid state light emitters 31 each comprise at least one light emitting diode and luminescent material. The solid state light emitters 32 each comprise at least one light emitting diode and no (or substantially no) luminescent material. In the arrangement depicted in FIG. 3, the light emitters 31 and 32 are arranged in a grid pattern, with a plurality of substantially parallel rows and a plurality of substantially parallel columns, and the light emitters 31 and 32 are arranged in a non-repeating pattern.

FIG. 4 depicts another alternative light emitter panel 40 for a backlit LCD device, comprising a plurality of multiple-chip packages 41 (also referred to as multi-chip packages), each multiple-chip package 41 comprising a solid state light emitter that emits BSY-1 light and a solid state light emitter that emits light having a dominant wavelength in the range of from about −495 nm to about −580 nm. The solid state light emitters that emit BSY-1 light each comprise at least one light emitting diode and luminescent material. The solid state light emitters that emit light having a dominant wavelength in the range of from about −495 nm to about −580 nm each comprise at least one light emitting diode and no (or substantially no) luminescent material. In the arrangement depicted in FIG. 4, the multiple-chip packages 41 are arranged in a grid pattern.

FIGS. 5 and 6 depict an edge-lit LCD device 50 in accordance with the present inventive subject matter. Referring to FIG. 5, the LCD device comprises a light emitter panel 51, a color filter panel 52, a horizontal polarizing filter panel 53, a liquid crystal matrix panel 54 and a vertical polarizing filter panel 55. FIG. 6 is a view taken between the color filter panel 52 and the light emitter panel 51, rotated 90 degrees about a center vertical axis in FIG. 5 and looking toward the light emitter panel 51. Referring to FIG. 6, the light emitter panel comprises light emitters 56 and 57, edge members 58 extending around the periphery of the light emitter panel 51, and a light guide 59. The light emitters 56 and 57 are mounted on the edge members 58. The light emitters 56 and 57 can be solid state light emitters, comprising a plurality of solid state light emitters 56 that emit BSY-1 light and a plurality of solid state light emitters 57 that emit light having a dominant wavelength in the range of from about −495 nm to about −580 nm. The solid state light emitters 56 each comprise at least one light emitting diode and luminescent material. The solid state light emitters 57 each comprise at least one light emitting diode and no (or substantially no) luminescent material. In the arrangement depicted in FIG. 6, the light emitters 56 and 57 are arranged in a repeating pattern, i.e., along each side edge, the light emitters 56 and 57 alternate. While the arrangement depicted in FIG. 6 includes only three light emitters on each side edge, any suitable number of light emitters can be on each edge (typical embodiments include a much larger number of light emitters, and some embodiments can include light emitters on all four edges, or any other number of edges).

FIG. 7 depicts an alternative light emitter panel 70 for an edge-lit LCD device that comprises a plurality of multiple-chip packages 71, edge members 72 extending around the periphery of the device 70, and a light guide 73. Each multiple-chip package comprises a solid state light emitter that emits BSY-1 light and a solid state light emitter that emits light having a dominant wavelength in the range of from about −495 nm to about −580 nm. The solid state light emitters that emit BSY-1 light each comprise at least one light emitting diode and luminescent material. The solid state light emitters that emit light having a dominant wavelength in the range of from about −495 nm to about −580 nm each comprise at least one light emitting diode and no (or substantially no) luminescent material.

FIG. 8 depicts another alternative light emitter panel 80 for an edge-lit LCD device that comprises light emitters 81 and 82, edge members 83 extending around the periphery of the device 80, a center frame member 84 and first and second light guides 85. Light emitters 81 can be mounted on the edge members 83 and/or on the center frame member 84, and light emitters 82 can similarly be mounted on the edge members 83 and/or on the center frame member 84. The light emitters 81 and 82 can be solid state light emitters, comprising a plurality of solid state light emitters 81 that emit BSY-1 light and a plurality of solid state light emitters 82 that emit light having a dominant wavelength in the range of from about −495 nm to about −580 nm. The solid state light emitters 81 each comprise at least one light emitting diode and luminescent material. The solid state light emitters 82 each comprise at least one light emitting diode and no (or substantially no) luminescent material.

FIGS. 9 and 10 depict a combination backlighting and edge-lighting LCD device 90 in accordance with the present inventive subject matter. Referring to FIG. 9, the LCD device comprises a light emitter panel 91, a color filter panel 92, a horizontal polarizing filter panel 93, a liquid crystal matrix panel 94 and a vertical polarizing filter panel 95. FIG. 10 is a view taken between the color filter panel 92 and the light emitter panel 91, rotated 90 degrees about a center vertical axis in FIG. 9 and looking toward the light emitter panel 91. Referring to FIG. 10, the light emitter panel 91 comprises light emitters 96 and 97, edge members 98 extending around the periphery of the device 90, and first and second light guides 99 and 100. Light emitters 96 can be mounted on the edge members 98 and/or on the center frame member, and/or on the light guides 99 and 100, and light emitters 97 can similarly be mounted on the edge members 98 and/or on the center frame member, and/or on the light guides 99 and 100. The light emitters 96 and 97 can be solid state light emitters, comprising a plurality of solid state light emitters 96 that emit BSY-1 light and a plurality of solid state light emitters 97 that emit light having a dominant wavelength in the range of from about −495 nm to about −580 nm. The solid state light emitters 96 each comprise at least one light emitting diode and luminescent material. The solid state light emitters 97 each comprise at least one light emitting diode and no (or substantially no) luminescent material. While the arrangement depicted in FIG. 10 includes only twenty edge-light emitters and eight backlight emitters, any suitable number of light emitters can be included.

FIG. 11 depicts another alternative light emitter panel 110 for a backlit LCD device, comprising a plurality of clusters 111 of light emitting diodes (instead of multiple-chip packages), each cluster 111 comprising a first solid state light emitter 112 that emits red light, a second solid state light emitter 113 that emits green light and a third solid state light emitter 114 that emits blue light. In the arrangement depicted in FIG. 11, the clusters 111 are arranged in a grid pattern.

In some embodiments in accordance with the present inventive subject matter, two or more modular light emitter panels can be joined together to make a larger light emitter panel. For instance, a plurality of panels as depicted in FIG. 2 could be joined together to make a larger rectangular panel (e.g., nine panels as depicted in FIG. 2 could be arranged in a three-by-three array, or 2,000 panels as depicted in FIG. 2 could be arranged in a fifty-by-forty array. Similarly, a plurality of panels as depicted in FIG. 6 (or a plurality of panels as depicted in FIG. 3, FIG. 4, FIG. 7, FIG. 8, FIG. 10, or FIG. 11) could be arranged in an array, or one or more of each of two or more types of panels could be arranged in an array, e.g., twenty-one panels as depicted in FIG. 10 and fifteen panels as depicted in FIG. 2 could be arranged in a six-by-six array.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the devices described herein can be integrated. Any structural part of the devices described herein can be provided in two or more parts (which may be held together in any known way, e.g., with adhesive, screws, bolts, rivets, staples, etc.).

The invention claimed is:
1. An LCD device, comprising:
a plurality of liquid crystals; and
at least one lighting device that emits light that has a color point that is within at least one area on a 1931 CIE Chromaticity Diagram selected from among a first area, a second area, a third area, a fourth area, a fifth area and a sixth area,
the first area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38,
the second area enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23, the fourth area enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28, the fifth area enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44, the sixth area enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44.

2. An LCD device as recited in claim 1, wherein the LCD device further comprises at least one solid state light emitter selected from among the group consisting of:

a solid state light emitter which, when illuminated, emits light having a peak wavelength in the range of from about 430 nm to about 480 nm;

a solid state light emitter which, when illuminated, emits light having a dominant wavelength in the range of from about 595 nm to about 625 nm;

a solid state light emitter which, when illuminated, emits light having a dominant wavelength in the range of from about 510 nm to about 560 nm;

a solid state light emitter which, when illuminated, emits light having a dominant wavelength in the range of from about 555 nm to about 585 nm;

a solid state light emitter which, when illuminated, emits light having a dominant wavelength in the range of from about 603 nm to about 800 nm;

a solid state light emitter which, when illuminated, emits light that has a color point on a 1931 CIE Chromaticity Diagram that is within said third area;

a solid state light emitter which, when illuminated, emits light having a dominant wavelength in the range of from about −495 nm to about −580 nm, and a solid state light emitter which, when illuminated, emits light having a dominant wavelength in the range of from about 495 nm to about 580 nm.

3. An LCD device as recited in claim 1, wherein the LCD device comprises at least a first surface mount solid state light emitter.

4. An LCD device as recited in claim 1, wherein the LCD device comprises at least a first lateral-emitting solid state light emitter selected from among sidelooker light emitting diodes and side emitter light emitting diodes.

5. An LCD device as recited in claim 4, wherein the first lateral-emitting solid state light emitter is a sidelooker light emitting diode that emits light that has a color point on a 1931 CIE Chromaticity Diagram that is within at least one of said first area and said second area.

6. An LCD device as recited in claim 1, wherein:
the LCD device comprises at least a first lateral-emitting solid state light emitter and a second lateral-emitting solid state light emitter,
the first lateral-emitting solid state light emitter is a sidelooker light emitting diode that emits light having a color point on a 1931 CIE Chromaticity Diagram that is within at least one of said first area and said second area, and
the second lateral-emitting solid state light emitter is a sidelooker light emitting diode that emits red light.

7. An LCD device as recited in claim 1, wherein the LCD device comprises at least one surface mount solid state light emitter and at least one lateral-emitting solid state light emitter selected from among sidelooker light emitting diodes and side emitter light emitting diodes.

8. An LCD device as recited in claim 1, wherein the LCD device comprises at least one light emitter that emits light that travels directly to another component of the LCD device.

9. An LCD device as recited in claim 1, wherein the LCD device comprises at least one light emitter selected from among sidelooker light emitting diodes and side emitter light emitting diodes, that emits light that travels indirectly to another component of the LCD device.

10. An LCD device as recited in claim 1, wherein the LCD device comprises lighting devices that emit light that have respective color points that are within at least two of the first, second, third, fourth, fifth and sixth areas on the 1931 CIE Chromaticity Diagram.

11. An LCD device as recited in claim 10, wherein the LCD device comprises lighting devices that emit light that have respective color points that are within:
[1] the first area and the third area;
[2] the first area and the fourth area;
[3] the first area and the fifth area;
[4] the first area and the sixth area;

[5] the second area and the third area;
[6] the second area and the fourth area;
[7] the second area and the fifth area;
[8] the second area and the sixth area;
[9] the third area and the fourth area;
[10] the third area and the fifth area; or
[11] the third area and the sixth area.

12. An LCD device as recited in claim 10, wherein the LCD device comprises lighting devices that emit light that have respective color points that are within:
[1] the first area and the third area; or
[2] the second area and the third area.

13. A light device, comprising:
at least one lighting device that emits light that has a color point that is within at least one area on a 1931 CIE Chromaticity Diagram selected from among a first area, a second area, a third area, a fourth area, a fifth area and a sixth area,
the first area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38,
the second area enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53,
the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23,
the fourth area enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28,
the fifth area enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44,
the sixth area enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44; and
at least one of: (a) at least one light guide, (b) at least one reflector, and (c) at least one light polarizer.

14. A light device as recited in claim 13, wherein the light device further comprises at least one solid state light emitter selected from among the group consisting of:
a solid state light emitter which, when illuminated, emits light having a peak wavelength in the range of from about 430 nm to about 480 nm;
a solid state light emitter which, when illuminated, emits light having a dominant wavelength in the range of from about 595 nm to about 625 nm;
a solid state light emitter which, when illuminated, emits light having a dominant wavelength in the range of from about 510 nm to about 560 nm;
a solid state light emitter which, when illuminated, emits light having a dominant wavelength in the range of from about 555 nm to about 585 nm;
a solid state light emitter which, when illuminated, emits light having a dominant wavelength in the range of from about 603 nm to about 800 nm;
a solid state light emitter which, when illuminated, emits light having a color point on a 1931 CIE Chromaticity Diagram that is within said third area;
a solid state light emitter which, when illuminated, emits light having a dominant wavelength in the range of from about −495 nm to about −580 nm, and
a solid state light emitter which, when illuminated, emits light having a dominant wavelength in the range of from about 495 nm to about 580 nm.

15. A light device as recited in claim 13, wherein:
the light device comprises at least a first light guide,
the first light guide has first, second and third orthogonal dimensions, and
each of the first and second orthogonal dimensions is at least twenty times the third orthogonal dimension.

16. A light device as recited in claim 13, wherein:
the light device comprises at least a first light guide,
the first light guide comprises at least a first light input region that comprises at least one of an input face and an input edge,
the first light guide stretches light along an axis substantially parallel with the input region.

17. A light device as recited in claim 13, wherein
the light device comprises at least a first light guide,
the first light guide comprises at least a first light input region that comprises at least one of an input face and an input edge,
the at least one lighting device comprises at least a first lighting device,
a surface area of the first light input region is greater than a surface area of the first lighting device from which light is emitted.

18. A light device as recited in claim 17, wherein the first lighting device comprises a lateral-emitting light emitter.

19. A light device as recited in claim 18, wherein the lateral-emitting light emitter is of a shape selected from among rectangular, square and round.

20. A light device as recited in claim 13, wherein the LCD device comprises lighting devices that emit light that have respective color points that are within at least two of the first, second, third, fourth, fifth and sixth areas on the 1931 CIE Chromaticity Diagram.

21. A light device as recited in claim 20, wherein the LCD device comprises lighting devices that emit light that have respective color points that are within:
[1] the first area and the third area;
[2] the first area and the fourth area;
[3] the first area and the fifth area;
[4] the first area and the sixth area;
[5] the second area and the third area;
[6] the second area and the fourth area;
[7] the second area and the fifth area;
[8] the second area and the sixth area;
[9] the third area and the fourth area;
[10] the third area and the fifth area; or
[11] the third area and the sixth area.

22. A light device as recited in claim 20, wherein the LCD device comprises lighting devices that emit light that have respective color points that are within:
[1] the first area and the third area; or
[2] the second area and the third area.

23. A light device as recited in claim 13, wherein:
the light device comprises at least a first light guide,
the first light guide comprises at least a first light input region that comprises at least a first input edge.

24. A light device as recited in claim 23, wherein:
the first light guide comprises at least one peripheral region, and
the at least one peripheral region comprises the first input edge.

25. A light device, comprising:
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 555 nm to about 585 nm; and
at least one of: (a) at least one light guide, having at least a first light entry region, through which at least some light emitted by the first group of solid state light emitters and at least some light emitted by the first luminescent material enters, and at least a first light exit region, through which at least some light emitted by the first group of solid state light emitters and at least some light emitted by the first luminescent material exits, a surface area of the at least a first light exit region larger than a surface area of the at least a first entry region, and (b) at least one light polarizer.

26. A light device as recited in claim 25, wherein at least a portion of the first luminescent material is provided in at least a first lumiphor.

27. A light device as recited in claim 25, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within at least one area on a 1931 CIE Chromaticity Diagram selected from among a first area and a second area,
the first area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38,
the second area enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53.

28. A light device as recited in claim 25, wherein when the first group of solid state light emitters is illuminated and at least a portion of the first luminescent material is excited, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within at least one area on a 1931 CIE Chromaticity Diagram selected from among a first area and a second area, the first area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, the second area enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53.

29. A light device as recited in claim 25, wherein the light device further comprises a second group of solid state light emitters which, when illuminated, emits light having a dominant wavelength in the range of from about −495 nm to about −580 nm.

30. A light device as recited in claim 25, wherein the light device further comprises a second group of solid state light emitters which, when illuminated, emits light having a dominant wavelength in the range of from about −495 nm to about −580 nm, and when the first group of solid state light emitters is illuminated and the second group of solid state light emitters is illuminated, a mixture of light exiting the lighting device which was emitted from the first group of solid state light emitters, light exiting the lighting device which was emitted from the first luminescent material and light exiting the lighting device which was emitted from the second group of solid state light emitters would produce a first group-second group mixed illumination having x, y coordinates on a 1931 CIE Chromaticity Diagram which define a point which is within twenty MacAdam ellipses of at least one point within the range of from about 2200K to about 20,000K on the blackbody locus on a 1931 CIE Chromaticity Diagram.

31. A light device as recited in claim 25, wherein:
the light device comprises at least a first light guide,
the first light guide comprises at least a first light input region that comprises at least a first input edge.

32. A light device as recited in claim 31, wherein:
the first light guide comprises at least one peripheral region, and
the at least one peripheral region comprises the first input edge.

33. A light device, comprising:
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 595 nm to about 625 nm; and
at least one of: (a) at least one light guide, having at least a first light entry region, through which at least some light emitted by the first group of solid state light emitters and at least some light emitted by the first luminescent material enters, and at least a first light exit region, through which at least some light emitted by the first group of solid state light emitters and at least some light emitted by the first luminescent material exits, a surface area of the at least a first light exit region larger than a surface area of the at least a first entry region, and (b) at least one light polarizer.

34. A light device as recited in claim 33, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within a third area, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23.

35. A light device as recited in claim 33, wherein the light device further comprises a second group of solid state light emitters which, when illuminated, emits light having a dominant wavelength in the range of from about 495 nm to about 580 nm.

36. A light device as recited in claim 33, wherein:
the light device comprises at least a first light guide,
the first light guide comprises at least a first light input region that comprises at least a first input edge.

37. A light device as recited in claim 36, wherein:
the first light guide comprises at least one peripheral region, and
the at least one peripheral region comprises the first input edge.

38. A light device, comprising:
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 510 nm to about 560 nm; and
at least one of: (a) at least one light guide, having at least a first light entry region, through which at least some light emitted by the first group of solid state light emitters and at least some light emitted by the first luminescent material enters, and at least a first light exit region, through which at least some light emitted by the first group of solid state light emitters and at least some light emitted by the first luminescent material exits, a surface area of the at least a first light exit region larger than a surface area of the at least a first entry region, and (b) at least one light polarizer.

39. A light device as recited in claim 38, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within at least one area on a 1931 CIE Chromaticity Diagram selected from among a fourth area, a fifth area and a sixth area, the fourth area enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28, the fifth area enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44, the sixth area enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44.

40. A light device as recited in claim 38, wherein the light device further comprises a second group of solid state light emitters which, when illuminated, emits light having a dominant wavelength in the range of from about 603 nm to about 800 nm and/or light that has a color point on a 1931 CIE Chromaticity Diagram that is within a third area, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23.

41. A light device as recited in claim 24, wherein:
the light device comprises at least a first light guide,
the first light guide comprises at least a first light input region that comprises at least a first input edge.

42. A light device as recited in claim 41, wherein:
the first light guide comprises at least one peripheral region, and
the at least one peripheral region comprises the first input edge.

43. An LCD device, comprising:
a plurality of liquid crystals; and
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 555 nm to about 585 nm.

44. An LCD device as recited in claim 43, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within at least one area on a 1931 CIE Chromaticity Diagram selected from among a first area and a second area, the first area enclosed by first, second, third, fourth and fifth line segments, the first line segment connecting a first point to a second point, the second line segment connecting the second point to a third point, the third line segment connecting the third point to a fourth point, the fourth line segment connecting the fourth point to a fifth point, and the fifth line segment connecting the fifth point to the first point, the first point having x, y coordinates of 0.32, 0.40, the second point having x, y coordinates of 0.36, 0.48, the third point having x, y coordinates of 0.43, 0.45, the fourth point having x, y coordinates of 0.42, 0.42, and the fifth point having x, y coordinates of 0.36, 0.38, the second area enclosed by sixth, seventh, eighth, ninth and tenth line segments, the fifth line segment connecting a fifth point to a sixth point, the seventh line segment connecting the seventh point to an eighth point, the eighth line segment connecting the eighth point to a ninth point, the ninth line segment connecting the ninth point to a tenth point, and the tenth line segment connecting the tenth point to the sixth point, the sixth point having x, y coordinates of 0.29, 0.36, the seventh point having x, y coordinates of 0.32, 0.35, the eighth point having x, y coordinates of 0.41, 0.43, the ninth point having x, y coordinates of 0.44, 0.49, and the tenth point having x, y coordinates of 0.38, 0.53.

45. An LCD device as recited in claim 43, wherein the LCD device further comprises a second group of solid state light emitters which, when illuminated, emits light having a dominant wavelength in the range of from about −495 nm to about −580 nm.

46. An LCD device, comprising:
a plurality of liquid crystals; and
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 595 nm to about 625 nm.

47. An LCD device as recited in claim 46, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within a third area, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23.

48. An LCD device as recited in claim 46, wherein the LCD device further comprises a second group of solid state light emitters which, when illuminated, emits light having a dominant wavelength in the range of from about 495 nm to about 580 nm.

49. An LCD device, comprising:
a plurality of liquid crystals; and
at least one lighting device comprising a first group of solid state light emitters and at least a first luminescent material, wherein:
the first group of solid state light emitters, when illuminated, emits light having a peak wavelength in the range of from about 430 nm to about 480 nm; and
the first luminescent material, when excited, emits light having a dominant wavelength in the range of from about 510 nm to about 560 nm.

50. An LCD device as recited in claim 49, wherein when the first group of solid state light emitters is illuminated, a mixture of light exiting the lighting device which was emitted from the first group of solid state light emitters and light exiting the lighting device which was emitted from the first luminescent material would, in the absence of any additional light, have a first group mixed illumination that has a color point on a 1931 CIE Chromaticity Diagram that is within at least one area on a 1931 CIE Chromaticity Diagram selected from among a fourth area, a fifth area and a sixth area,
the fourth area enclosed by fifteenth, sixteenth, seventeenth, eighteenth and nineteenth line segments, the fifteenth line segment connecting a fifteenth point to a sixteenth point, the sixteenth line segment connecting the sixteenth point to a seventeenth point, the seventeenth line segment connecting the seventeenth point to an eighteenth point, the eighteenth line segment connecting the eighteenth point to a nineteenth point, and the nineteenth line segment connecting the nineteenth point to the fifteenth point, the fifteenth point having x, y coordinates of 0.35, 0.48, the sixteenth point having x, y coordinates of 0.26, 0.50, the seventeenth point having x, y coordinates of 0.13, 0.26, the eighteenth point having x, y coordinates of 0.15, 0.20, and the nineteenth point having x, y coordinates of 0.26, 0.28,
the fifth area enclosed by twentieth, twenty-first, twenty-second and twenty-third line segments, the twentieth line segment connecting a twentieth point to a twenty-first point, the twenty-first line segment connecting the twenty-first point to a twenty-second point, the twenty-second line segment connecting the twenty-second point to a twenty-third point, the twenty-third line segment connecting the twenty-third point to the twentieth point, the twentieth point having x, y coordinates of 0.21, 0.28, the twenty-first point having x, y coordinates of 0.26, 0.28, the twenty-second point having x, y coordinates of 0.32, 0.42, and the twenty-third point having x, y coordinates of 0.28, 0.44,
the sixth area enclosed by twenty-twenty-seventh, twenty-fifth, twenty-sixth and twenty-seventh line segments, the twenty-fourth line segment connecting a twenty-fourth point to a twenty-fifth point, the twenty-fifth line segment connecting the twenty-fifth point to a twenty-sixth point, the twenty-sixth line segment connecting the twenty-sixth point to a twenty-seventh point, the twenty-seventh line segment connecting the twenty-seventh point to the twenty-fourth point, the twenty-fourth point having x, y coordinates of 0.30, 0.49, the twenty-fifth point having x, y coordinates of 0.35, 0.48, the twenty-sixth point having x, y coordinates of 0.32, 0.42, and the twenty-seventh point having x, y coordinates of 0.28, 0.44.

51. An LCD device as recited in claim 49, wherein the LCD device further comprises a second group of solid state light emitters which, when illuminated, emits light having a dominant wavelength in the range of from about 603 nm to about 800 nm and/or light that has a color point on a 1931 CIE Chromaticity Diagram that is within a third area, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23.

52. An LCD device, comprising:
at least one lighting device comprising:
a first group of solid state light emitters and at least a first luminescent material, and
at least one of: (a) at least one light guide, having at least a first light entry region, through which at least some light emitted by the first group of solid state light emitters and at least some light emitted by the first luminescent material enters, and at least a first light exit region, through which at least some light emitted by the first group of solid state light emitters and at least some light emitted by the first luminescent material exits, a surface area of the at least a first light exit region larger than a surface area of the at least a first entry region, (b) at least one reflector, and (c) at least one light polarizer, wherein:

the first group of solid state light emitters, when illuminated, emits light having a peak wavelength in the range of from about 430 nm to about 480 nm, and the first luminescent material, when excited, emits light having a dominant wavelength in the range of from about 555 nm to about 585 nm.

53. An LCD device as recited in claim 52, wherein the LCD device further comprises a second group of solid state light emitters which, when illuminated, emits light having a dominant wavelength in the range of from about −495 nm to about −580 nm.

54. An LCD device as recited in claim 52, wherein:
the light device comprises at least a first light guide,
the first light guide comprises at least a first light input region that comprises at least a first input edge.

55. An LCD device as recited in claim 54, wherein:
the first light guide comprises at least one peripheral region, and
the at least one peripheral region comprises the first input edge.

56. An LCD device, comprising:
at least one lighting device comprising:
a first group of solid state light emitters and at least a first luminescent material, and
at least one of: (a) at least one light guide, (b) at least one reflector, and (c) at least one light polarizer, wherein:
the first group of solid state light emitters, when illuminated, emits light having a peak wavelength in the range of from about 430 nm to about 480 nm, and
the first luminescent material, when excited, emits light having a dominant wavelength in the range of from about 595 nm to about 625 nm.

57. An LCD device as recited in claim 56, wherein the LCD device further comprises a second group of solid state light emitters which, when illuminated, emits light having a dominant wavelength in the range of from about 495 nm to about 580 nm.

58. An LCD device as recited in claim 56, wherein:
the light device comprises at least a first light guide,
the first light guide comprises at least a first light input region that comprises at least a first input edge.

59. An LCD device as recited in claim 58, wherein:
the first light guide comprises at least one peripheral region, and
the at least one peripheral region comprises the first input edge.

60. An LCD device, comprising:
at least one lighting device comprising:
a first group of solid state light emitters and at least a first luminescent material, and
at least one of: (a) at least one light guide, having at least a first light entry region, through which at least some light emitted by the first group of solid state light emitters and at least some light emitted by the first luminescent material enters, and at least a first light exit region, through which at least some light emitted by the first group of solid state light emitters and at least some light emitted by the first luminescent material exits, a surface area of the at least a first light exit region larger than a surface area of the at least a first entry region, and (b) at least one reflector, and (c) at least one light polarizer, wherein:
the first group of solid state light emitters, when illuminated, emits light having a peak wavelength in the range of from about 430 nm to about 480 nm, and
the first luminescent material, when excited, emits light having a dominant wavelength in the range of from about 510 nm to about 560 nm.

61. An LCD device as recited in claim 60, wherein the LCD device further comprises a second group of solid state light emitters which, when illuminated, emits light having a dominant wavelength in the range of from about 603 nm to about 800 nm and/or light that has a color point on a 1931 CIE Chromaticity Diagram that is within a third area, the third area enclosed by eleventh, twelfth, thirteenth and fourteenth line segments, the eleventh line segment connecting an eleventh point to a twelfth point, the twelfth line segment connecting the twelfth point to a thirteenth point, the thirteenth line segment connecting the thirteenth point to a fourteenth point, the fourteenth line segment connecting the fourteenth point to the eleventh point, the eleventh point having x, y coordinates of 0.57, 0.35, the twelfth point having x, y coordinates of 0.62, 0.32, the thirteenth point having x, y coordinates of 0.37, 0.16, and the fourteenth point having x, y coordinates of 0.40, 0.23.

62. An LCD device as recited in claim 30, wherein:
the light device comprises at least a first light guide,
the first light guide comprises at least a first light input region that comprises at least a first input edge.

63. An LCD device as recited in claim 62, wherein:
the first light guide comprises at least one peripheral region, and
the at least one peripheral region comprises the first input edge.

\* \* \* \* \*

UNITED STATES PATENT AND TRADEMARK OFFICE
CERTIFICATE OF CORRECTION

| | | |
|---|---|---|
| PATENT NO. | : 9,921,428 B2 | Page 1 of 2 |
| APPLICATION NO. | : 13/042663 | |
| DATED | : March 20, 2018 | |
| INVENTOR(S) | : Antony Paul Van De Ven, Gerald H. Negley and Shawn Pyles | |

It is certified that error appears in the above-identified patent and that said Letters Patent is hereby corrected as shown below:

On the Title Page

Page 2, Other Publications, Right Column:
Please change: "2007/0278934, Dec. 6, 1007, U.S. Appl. No. 11/736,761, filed Apr. 18, 2007, Vande Ven" to -- 2007/0278934, Dec. 6, 2007, U.S. Appl. No. 11/736,761, filed Apr. 18, 2007, Van de Ven. --

Page 2, Other Publications, Right Column:
Please change: "2008-0304260m, Dec. 11, 2008, U.S. Appl. No. 12/117,122, filed May 8, 2008, Van de Ven." to -- 2008/0304260, Dec. 11, 2008, U.S. Appl. No. 12/117,122, filed May 8, 2008, Van de Ven. --

In the Claims

Column 32, Lines 55 - 56, Claim 1:
Please change: "ninth and tenth line segments, the fifth line segment connecting a fifth point to a sixth point, the seventh" to -- ninth and tenth line segments, the sixth line segment connecting a sixth point to a seventh point, the seventh --

Column 33, Line 44, Claim 1:
Please change: "the sixth area enclosed by twenty-twenty-seventh," to -- the sixth area enclosed by twenty-fourth --

Column 35, Lines 34 - 35, Claim 13:
Please change: "ninth and tenth line segments, the fifth line segment connecting a fifth point to a sixth point, the seventh" to -- ninth and tenth line segments, the sixth line segment connecting a sixth point to a seventh point, the seventh --

Signed and Sealed this
Twenty-eighth Day of August, 2018

Andrei Iancu
*Director of the United States Patent and Trademark Office*

CERTIFICATE OF CORRECTION (continued)
U.S. Pat. No. 9,921,428 B2

Column 36, Line 23, Claim 13:
Please change: "the sixth area enclosed by twenty-twenty-seventh," to -- the sixth area enclosed by twenty-fourth, --

Column 38, Lines 45 - 46, Claim 27:
Please change: "and tenth line segments, the fifth line segment connecting a fifth point to a sixth point, the seventh line" to -- and tenth line segments, the sixth line segment connecting a sixth point to a seventh point, the seventh line --

Column 39, Lines 16 - 17, Claim 28:
Please change: "and tenth line segments, the fifth line segment connecting a fifth point to a sixth point, the seventh line" to -- and tenth line segments, the sixth line segment connecting a sixth point to a seventh point, the seventh line --

Column 41, Line 42, Claim 39:
Please change: "the sixth area enclosed by twenty-twenty-seventh, twenty-" to -- the sixth area enclosed by twenty-fourth, twenty- --

Column 42, Line 6, Claim 41:
Please change: "A light device as recited in claim 24, wherein:" to -- A light device as recited in claim 38, wherein: --

Column 42, Lines 50 - 51, Claim 44:
Please change: "and tenth line segments, the fifth line segment connecting a fifth point to a sixth point, the seventh line" to -- and tenth line segments, the sixth line segment connecting a sixth point to a seventh point, the seventh line --

Column 44, Line 19, Claim 50:
Please change: "the sixth area enclosed by twenty-twenty-seventh, twenty-" to -- the sixth area enclosed by twenty-fourth, twenty- --

Column 46, Line 40, Claim 62:
Please change: "An LCD device as recited in claim 30, wherein:" to -- An LCD device as recited in claim 60, wherein: --